United States Patent
Gu et al.

(10) Patent No.: US 10,142,907 B2
(45) Date of Patent: Nov. 27, 2018

(54) METHOD AND APPARATUS FOR DYNAMICALLY COMBINING CELLS, NETWORK DEVICE, AND SYSTEM

(71) Applicant: Huawei Technologies Co., Ltd., Shenzhen (CN)

(72) Inventors: Zilong Gu, Chengdu (CN); Songtao Li, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/883,969

(22) Filed: Jan. 30, 2018

(65) Prior Publication Data

US 2018/0152876 A1 May 31, 2018

Related U.S. Application Data

(63) Continuation of application No. PCT/CN2015/085810, filed on Jul. 31, 2015.

(51) Int. Cl.
*H04W 36/32* (2009.01)

(52) U.S. Cl.
CPC ................... *H04W 36/32* (2013.01)

(58) Field of Classification Search
CPC . H04W 36/18; H04W 36/0072; H04W 36/20; H04W 36/24
USPC .................. 455/436, 437, 440, 442; 370/331
See application file for complete search history.

(56) References Cited

U.S. PATENT DOCUMENTS

| 2013/0157664 | A1 | 6/2013 | Chow et al. |
| 2014/0335865 | A1 | 11/2014 | Zhang et al. |
| 2015/0065146 | A1 | 3/2015 | Wenger |
| 2015/0065147 | A1 | 3/2015 | Kuwahara |

FOREIGN PATENT DOCUMENTS

| CN | 101873566 A | 10/2010 |
| CN | 103703821 A | 4/2014 |
| CN | 104105145 A | 10/2014 |
| JP | 2013135282 A | 7/2013 |
| WO | 2015077933 A1 | 6/2015 |

OTHER PUBLICATIONS

3GPP TR 25.800, V12.1.0, "3rd Generation Partnership Project; Technical Specification Group Radio Access Network; Study on UMTS heterogeneous networks," (Release 12), Dec. 2013, 166 pages.
3GPP TSG RAN WG4 Meeting #75, R4-153659, "Modified arrangement for RRH based model," Ericsson, May 25-29, 2015, 8 pages.

*Primary Examiner* — Sam Bhattacharya
(74) *Attorney, Agent, or Firm* — Slater Matsil, LLP

(57) ABSTRACT

A method includes obtaining a quantity of user equipments UEs in a high-speed movement state in a target cell, where the target cell and the neighboring cell are cells distributed along a high-speed movement path, and the UEs in the high-speed movement state are UEs that are in a connected mode and whose movement speeds are greater than a preset threshold. The method also includes combining the target cell with the neighboring cell when the quantity of the UEs in the high-speed movement state in the target cell is greater than a first preset quantity, and sending data to one or more UEs in the high-speed movement state by using a combined cell.

20 Claims, 19 Drawing Sheets

METHOD AND APPARATUS FOR DYNAMICALLY COMBINING CELLS, NETWORK DEVICE, AND SYSTEM

CROSS-REFERENCE TO RELATED APPLICATIONS

This application is a continuation of International Application No. PCT/CN2015/085810, filed on Jul. 31, 2015, the disclosure of which is hereby incorporated by reference in its entirety.

TECHNICAL FIELD

The present invention relates to the field of communications technologies, and in particular, to a method and an apparatus for dynamically combining cells, a network device, and a system.

BACKGROUND

In 3GPP Long Term Evolution (LTE) and as a common technology in high-speed railway coverage, LTE cell combination is a technology of combining multiple physical cells into one logical cell, so that no handover is required in an entire journey on a high-speed railway. According to the LTE cell combination technology, a cell coverage area is expanded, and a quantity of handovers is reduced and a handover delay is shortened when a user on the high-speed railway uses an LTE network, thereby reducing temporary information transmission interruptions caused by a disconnection from a network when the user performs network handover.

However, a total capacity of a combined cell is far less than a total capacity of cells when the cells are not combined, resulting in a limited cell capacity. When a quantity of users increases, some users even cannot access a network.

SUMMARY

Embodiments of the present invention provide a method and an apparatus for dynamically combining cells, a network device, and a system, so as to resolve a problem in the prior art that a capacity is limited after cell combination, and increase a cell capacity.

According to a first aspect, an embodiment of the present invention provides a method for dynamically combining cells. The method may include obtaining a quantity of user equipments (UEs) in a high-speed movement state in a target cell, where the target cell is capable of being combined with a neighboring cell of the target cell, the target cell and the neighboring cell are cells distributed along a high-speed movement path, and the UEs in the high-speed movement state are UEs that are in a connected mode and whose movement speeds are greater than a preset threshold. The method may also include combining the target cell with the neighboring cell when the quantity of the UEs in the high-speed movement state in the target cell is greater than a first preset quantity. The method may further include sending data to the UEs in the high-speed movement state by using a combined cell.

With reference to the first aspect, in a first possible implementation, the method further includes: separating the target cell from the neighboring cell when the quantity of the UEs in the high-speed movement state in the target cell is less than or equal to the first preset quantity and the target cell and the neighboring cell are in a cell combined state.

With reference to the first aspect or the first possible implementation of the first aspect, in a second possible implementation, the combining the target cell with the neighboring cell when the quantity of the UEs in the high-speed movement state in the target cell is greater than a first preset quantity includes: determining a movement direction of the UEs in the high-speed movement state when the quantity of the UEs in the high-speed movement state in the target cell is greater than the first preset quantity; and combining, according to the movement direction, the target cell with a neighboring cell that the UEs in the high-speed movement state are about to enter.

With reference to the second possible implementation of the first aspect, in a third possible implementation, the determining a movement direction of the UEs in the high-speed movement state includes: obtaining a cell handover history record of the UEs in the high-speed movement state; and determining the movement direction of the UEs in the high-speed movement state according to the cell handover history record.

With reference to the second possible implementation of the first aspect, in a fourth possible implementation, the determining a movement direction of the UEs in the high-speed movement state includes: obtaining a unique identifier of a neighboring cell with which the target cell is combined last time, where the unique identifier is a numeric identifier that sequentially marks the cell distributed along the high-speed movement path; and determining and predicting the movement direction of the UEs in the high-speed movement state according to a unique identifier of the target cell and the obtained unique identifier of the neighboring cell.

With reference to the second possible implementation of the first aspect, the third possible implementation of the first aspect, or the fourth possible implementation of the first aspect, in a fifth possible implementation, the step of obtaining a quantity of user equipments UEs in a high-speed movement state in a target cell is performed according to a preset time interval. Also, the combining, according to the movement direction, the target cell with a neighboring cell that the UEs in the high-speed movement state are about to enter includes: determining, according to the movement direction, whether the target cell has been combined with the neighboring cell that the UEs in the high-speed movement state are about to enter; and combining the target cell with the neighboring cell that the UEs are about to enter if the two cells are not combined.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, both the target cell and the neighboring cell support a first carrier frequency and a second carrier frequency. Also, before the combining the target cell with the neighboring cell, the method further includes: detecting whether the target cell includes a UE in a low-speed movement state, where the UE in the low-speed movement state is a UE that is in a connected mode and whose movement speed is less than the preset threshold; and if the target cell includes the UE in the low-speed movement state, handing over the UE in the low-speed movement state to the first carrier frequency to perform data transmission and receiving, and handing over the UEs in the high-speed movement state to the second carrier frequency to perform data transmission and receiving.

With reference to the sixth possible implementation of the first aspect, in a seventh possible implementation, after the obtaining a quantity of user equipments UEs in a high-speed movement state in a target cell, the method further includes: separating the target cell from the neighboring cell when the quantity of the UEs in the high-speed movement state in the target cell is less than or equal to the first preset quantity and the target cell and the neighboring cell are in the cell combined state; and when it is determined that there is a UE in the low-speed movement state on the first carrier frequency for the target cell, handing over at least one UE in the low-speed movement state to the second carrier frequency to perform data transmission and receiving.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, the combining the target cell with the neighboring cell includes: changing respective physical cell identifiers PCIs of the target cell and the neighboring cell into a preset PCI; and configuring a parameter for the target cell and the neighboring cell according to a preset cell combination rule.

With reference to the eighth possible implementation of the first aspect, in a ninth possible implementation, after the obtaining a quantity of user equipments UEs in a high-speed movement state in a target cell, the method further includes: when the quantity of the UEs in the high-speed movement state in the target cell is less than or equal to the first preset quantity and the target cell and the neighboring cell are in the cell combined state, restoring the preset PCI into which the PCI of the target cell is changed to a PCI that exists before the cell combination; and restoring the parameter configured for the target cell according to the preset cell combination rule to a parameter that exists before the cell combination.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, or the ninth possible implementation of the first aspect, in a tenth possible implementation, the sending data to the UEs in the high-speed movement state by using a combined cell includes: cooperatively sending the data to the UEs in the high-speed movement state by using the target cell and the neighboring cell in the combined cell.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, or the ninth possible implementation of the first aspect, in an eleventh possible implementation, the cells distributed along the high-speed movement path use IP radio access network IPRAN networking. Also, the sending data to the UEs in the high-speed movement state by using a combined cell includes: determining whether the target cell and the neighboring cell in the combined cell are co-site cells; and synchronously sending the data to the UEs in the high-speed movement state by using the target cell and the neighboring cell if the two cells are co-site cells; or obtaining information about a transmission delay between the target cell and the neighboring cell if the two cells are not co-site cells; and synchronously sending the data to the UEs in the high-speed movement state by using the target cell and the neighboring cell after a corresponding time is delayed in the target cell according to the information about the transmission delay.

With reference to the tenth possible implementation of the first aspect or the eleventh possible implementation of the first aspect, in a twelfth possible implementation, before the sending data to the UEs in the high-speed movement state by using a combined cell, the method further includes: when it is determined that there is more than one high-speed cell in the combined cell, obtaining a quantity of UEs in the high-speed movement state in each cell in the combined cell, and counting a total quantity of UEs in the high-speed movement state, where the high-speed cell is a cell, in the combined cell, in which a quantity of UEs in the high-speed movement state is greater than a second preset quantity; and dynamically allocating time domain resources to the UEs in the high-speed movement state within a transmission time interval TTI of the combined cell according to the total quantity of the UEs in the high-speed movement state and a preset allocation rule, so as to perform, on the allocated time domain resources, the step of sending data to the UEs in the high-speed movement state by using a combined cell.

According to a second aspect, an embodiment of the present invention provides an apparatus for dynamically combining cells, where the apparatus may include: an obtaining module, configured to obtain a quantity of user equipments UEs in a high-speed movement state in a target cell, where the target cell is capable of being combined with a neighboring cell of the target cell, the target cell and the neighboring cell are cells distributed along a high-speed movement path, and the UEs in the high-speed movement state are UEs that are in a connected mode and whose movement speeds are greater than a preset threshold. The apparatus may also include a combination module, configured to combine the target cell with the neighboring cell when the quantity of the UEs in the high-speed movement state in the target cell is greater than a first preset quantity. The apparatus may further include a sending module, configured to send data to the UEs in the high-speed movement state by using a combined cell.

With reference to the second aspect, in a first possible implementation, the apparatus further includes: a first separation module, configured to separate the target cell from the neighboring cell when the quantity of the UEs in the high-speed movement state in the target cell is less than or equal to the first preset quantity and the target cell and the neighboring cell are in a cell combined state.

With reference to the second aspect or the first possible implementation of the second aspect, in a second possible implementation, the combination module includes: a first determining unit, configured to determine a movement direction of the UEs in the high-speed movement state when the quantity of the UEs in the high-speed movement state in the target cell is greater than the first preset quantity; and a first combination unit, configured to combine, according to the movement direction, the target cell with a neighboring cell that the UEs in the high-speed movement state are about to enter.

With reference to the second possible implementation of the second aspect, in a third possible implementation, the first determining unit includes: a first obtaining subunit, configured to obtain a cell handover history record of the UEs in the high-speed movement state; and a first determining subunit, configured to determine the movement direction of the UEs in the high-speed movement state according to the cell handover history record.

With reference to the second possible implementation of the second aspect, in a fourth possible implementation, the first determining unit includes: a second obtaining subunit, configured to obtain a unique identifier of a neighboring cell with which the target cell is combined last time, where the unique identifier is a numeric identifier that sequentially marks the cell distributed along the high-speed movement path; and a second determining subunit, configured to determine and predict the movement direction of the UEs in the high-speed movement state according to a unique identifier of the target cell and the obtained unique identifier of the neighboring cell.

With reference to the second possible implementation of the second aspect, the third possible implementation of the second aspect, or the fourth possible implementation of the second aspect, in a fifth possible implementation, the obtaining module is specifically configured to perform the step of obtaining a quantity of user equipments UEs in a high-speed movement state in a target cell according to a preset time interval. Also, the first combination unit includes: a third determining subunit, configured to determine, according to the movement direction, whether the target cell has been combined with the neighboring cell that the UEs in the high-speed movement state are about to enter; and a first combination subunit, configured to combine the target cell with the neighboring cell that the UEs are about to enter if the two cells are not combined.

With reference to the second aspect, the first possible implementation of the second aspect, the second possible implementation of the second aspect, the third possible implementation of the second aspect, the fourth possible implementation of the second aspect, or the fifth possible implementation of the second aspect, in a sixth possible implementation, both the target cell and the neighboring cell support a first carrier frequency and a second carrier frequency. Also, the combination module includes: a detection unit, configured to detect whether the target cell includes a UE in a low-speed movement state when the quantity of the UEs in the high-speed movement state in the target cell is greater than the first preset quantity, where the UE in the low-speed movement state is a UE that is in a connected mode and whose movement speed is less than the preset threshold. The combination module further includes a handover unit, configured to: if a determining result is that the target cell includes the UE in the low-speed movement state, hand over the UE in the low-speed movement state to the first carrier frequency to perform data transmission and receiving, and hand over the UEs in the high-speed movement state to the second carrier frequency to perform data transmission and receiving. The combination module also includes a second combination unit, configured to combine the target cell with the neighboring cell.

With reference to the sixth possible implementation of the second aspect, in a seventh possible implementation, the apparatus further includes: a second separation module, configured to separate the target cell from the neighboring cell when the quantity of the UEs in the high-speed movement state in the target cell is less than or equal to the first preset quantity and the target cell and the neighboring cell are in a cell combined state; and a handover module, configured to: when it is determined that there is a UE in the low-speed movement state on the first carrier frequency for the target cell, hand over at least one UE in the low-speed movement state to the second carrier frequency to perform data transmission and receiving.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, or the seventh possible implementation of the second aspect, in an eighth possible implementation, the combination module includes: a changing unit, configured to change respective physical cell identifiers PCIs of the target cell and the neighboring cell into a preset PCI when the quantity of the UEs in the high-speed movement state in the target cell is greater than the first preset quantity; and a configuration unit, configured to configure a parameter for the target cell and the neighboring cell according to a preset cell combination rule.

With reference to the eighth possible implementation of the second aspect, in a ninth possible implementation, the apparatus further includes: a first restoration module, configured to: when the quantity of the UEs in the high-speed movement state in the target cell is less than or equal to the first preset quantity and the target cell and the neighboring cell are in the cell combined state, restore the preset PCI into which the PCI of the target cell is changed to a PCI that exists before the cell combination; and a second restoration module, configured to restore the parameter configured for the target cell according to the preset cell combination rule to a parameter that exists before the cell combination.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, the eighth possible implementation of the second aspect, or the ninth possible implementation of the second aspect, in a tenth possible implementation, the sending module is specifically configured to: cooperatively send the data to the UEs in the high-speed movement state by using the target cell and the neighboring cell in the combined cell.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, the eighth possible implementation of the second aspect, or the ninth possible implementation of the second aspect, in an eleventh possible implementation, the cells distributed along the high-speed movement path use IP radio access network IPRAN networking. Also, the sending module includes: a second determining unit, configured to determine whether the target cell and the neighboring cell in the combined cell are co-site cells; a first synchronization unit, configured to synchronously send the data to the UEs in the high-speed movement state by using the target cell and the neighboring cell if a determining result is that the two cells are co-site cells; an obtaining unit, configured to obtain information about a transmission delay between the target cell and the neighboring cell if a determining result is that the two cells are not co-site cells; and a second synchronization unit, configured to synchronously send the data to the UEs in the high-speed movement state by using the target cell and the neighboring cell after a corresponding time is delayed in the target cell according to the information about the transmission delay.

With reference to the tenth possible implementation of the second aspect or the eleventh possible implementation of the second aspect, in a twelfth possible implementation, the apparatus further includes: a counting module, configured to: when it is determined that there is more than one high-speed cell in the combined cell, obtain a quantity of UEs in the high-speed movement state in each cell in the combined cell, and count a total quantity of UEs in the high-speed movement state, where the high-speed cell is a cell, in the combined cell, in which a quantity of UEs in the high-speed movement state is greater than a second preset quantity; and an allocation module, configured to dynamically allocate time domain resources to the UEs in the high-speed movement state within a transmission time interval TTI of the combined cell according to the total quantity of the UEs in the high-speed movement state and a preset allocation rule, so as to perform, on the allocated time domain resources, the step of sending data to the UEs in the high-speed movement state by using a combined cell.

In the embodiments of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in the embodiments of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in the embodiments of the present invention, the combined cell may be further dynamically separated, so as to release a resource when there are fewer UEs in the high-speed movement state, further increasing the capacity of the cells along the high-speed transportation line.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
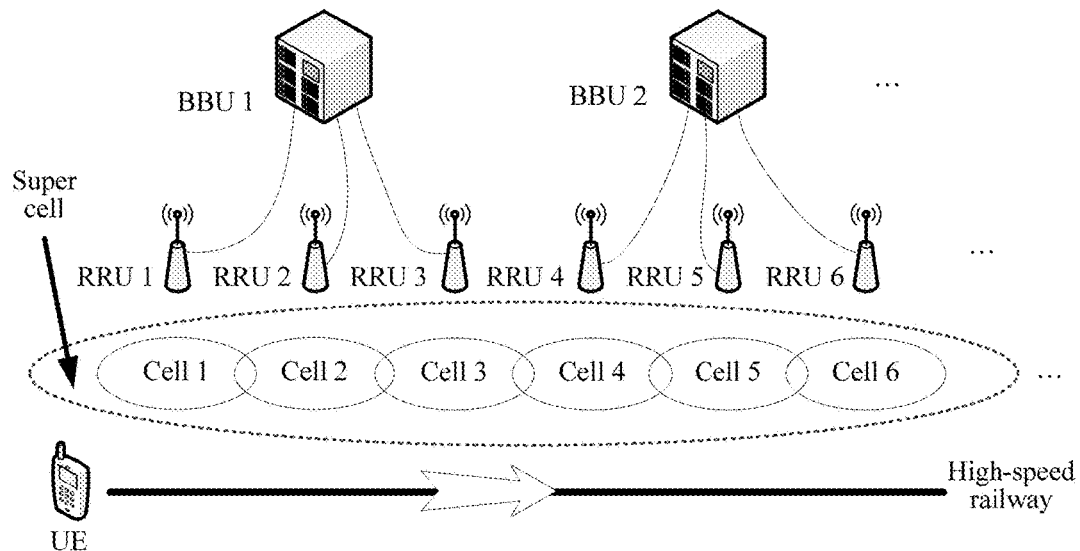
FIG. 1 is a schematic diagram of a network architecture of a super cell.

For ease of understanding the embodiments of the present invention, a network architecture of a super cell on which the embodiments of the present invention are based is first described below. Referring to FIG. 1, FIG. 1 is a schematic diagram of a network architecture of a super cell. As shown in FIG. 1, cell 1 to cell 6 are coverage cells that correspond to a base station and that are disposed along a high-speed railway. A distributed base station architecture, for example, a distributed base station including a base band unit (BBU) and a radio remote unit (RRU), may be used. The BBU and the RRU are connected by using a fiber, and one BBU can support multiple RRUs. The BBU mainly performs functions such as baseband signal processing and transmission as well as functions of a master controller and a clock. The RRU mainly performs processing including radio frequency signal filtering, signal amplification, and up- and down-frequency conversion, and uses a digital intermediate frequency technology to convert an intermediate frequency analog signal into a baseband digital signal.

The super cell is a technology based on a single frequency network (SFN). The SFN means that multiple radio transmitting stations at different places and in a synchronization state simultaneously transmit a same signal at a same frequency, to reliably cover a particular service area. Therefore, in the embodiments of the present invention, cells along a high-speed transportation line can also be based on the SFN. That is, a target cell and a neighboring cell in the embodiments of the present invention have to satisfy SFN characteristics such as co-frequency and clock synchronization.

It can be understood that the foregoing network architecture is only an implementation in the embodiments of the present invention. A network architecture in the embodiments of the present invention includes but is not merely limited to the foregoing network architecture, and each network architecture that can implement cell combination falls within the protection and coverage scope of the present invention.

It should be further noted that user equipment UE in the embodiments of the present invention includes but is not limited to communications devices such as a smartphone, a tablet computer, a media player, a smart TV, a smart band, a smart wearable device, an MP3 (Moving Picture Experts Group Audio Layer-3) player, an MP4 (Moving Picture Experts Group Layer-4) player, a personal digital assistant (PDA), a portable laptop computer, and a desktop computer that can communicate and interact with a base station or another network device.

Specific application scenarios of the embodiments of the present invention include but are not merely limited to highways, railroads, high-speed railways, tunnels, and the like. In the embodiments of the present invention, an application scenario of a high-speed railway is mainly used for detailed description and illustration.

Figure 2:
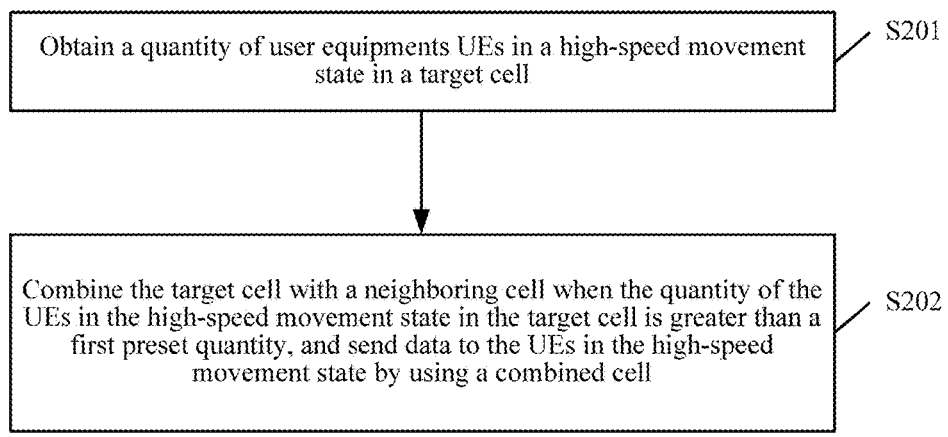
FIG. 2 is a schematic flowchart of a method for dynamically combining cells according to the present invention.

Referring to FIG. 2, FIG. 2 is a schematic flowchart of a method for dynamically combining cells according to an embodiment of the present invention. A description is provided below from a perspective of a network device side with reference to FIG. 2. As shown in FIG. 2, the method may include the following step S201 and step S202.

Step S201: Obtain a quantity of user equipments UEs in a high-speed movement state in a target cell.

Specifically, in this embodiment of the present invention, the target cell is capable of being combined with a neighboring cell of the target cell, and the target cell and the neighboring cell are cells distributed along a high-speed movement path, that is, in a line shape rather than a star shape, such as cells along a high-speed railway, cells along a highway, or cells along a railroad. Because only a UE that is connected to a network device such as a base station needs to be handed over to a cell, the UEs in the high-speed movement state are UEs that are in a connected mode and whose movement speeds are greater than a preset threshold, for example, a UE making a call or a UE accessing the Internet or using an SMS message or another service on a high-speed railway whose driving speed reaches a particular value. The preset threshold may be properly set according to a practical application scenario. It should be noted that due to a train length, generally, a length of one train does not go beyond a coverage area of three cells. Generally, a coverage area of one cell is approximately 200 m, and a length of one train is approximately 300 m. Normally, one train does not go beyond a coverage area of three cells at a moment. It can be understood that in the present invention, each of the cells distributed along the high-speed movement path is a target cell, and the target cell is not limited to a particular cell. Therefore, in this embodiment of the present invention, the description provided from the perspective of the network device side may be understood as a description provided from a perspective of a network device side of each target cell, that is, a base station side corresponding to the target cell.

Further, a Doppler frequency offset of a UE under a high-speed driving condition changes to some degree. Therefore, whether a UE is a UE in the high-speed movement state whose movement speed is greater than the preset threshold may be determined by obtaining a Doppler frequency offset of the UE. Specifically, a Doppler frequency offset of a UE in a connected mode in the target cell is obtained; when it is determined that the Doppler frequency offset is greater than the preset threshold, the UE is determined as a UE in the high-speed movement state; a quantity of UEs determined to be in the high-speed movement state is calculated, thereby finally obtaining the quantity of the user equipments UEs in the high-speed movement state in the target cell.

Further, when it is determined that the Doppler frequency offset is greater than the preset threshold, whether the UE is handed over from the neighboring cell of the target cell continues to be determined. If the UE is handed over from the neighboring cell of the target cell, the UE is determined as a UE in the high-speed movement state, so as to prevent a UE that quickly moves for a short time near the high-speed railway from being mistakenly determined as a UE in the high-speed movement state. A combined cell is a logical cell. Although physical cell identifiers (PCI) of the target cell and the neighboring cell are the same, respective independent cell global identifiers (CGI) are configured for the target cell and the neighboring cell. Therefore, a handover record may be obtained according to different CGIs of different cells accessed by the UE in the high-speed movement state.

Step S202: Combine the target cell with a neighboring cell when the quantity of the UEs in the high-speed movement state in the target cell is greater than a first preset quantity, and send data to the UEs in the high-speed movement state by using a combined cell.

Specifically, a relationship between the quantity of the UEs in the high-speed movement state in the target cell and the first preset quantity is determined. When the quantity of the UEs in the high-speed movement state in the target cell is greater than the preset quantity, the target cell and the neighboring cell are combined. The target cell and the neighboring cell have a linear relationship, that is, each target cell has two neighboring cells respectively at the left and right sides. Therefore, in this embodiment of the present invention, the target cell and the neighboring cell are combined, which means that the target cell is combined with both neighboring cells respectively at the left and right sides, or means that the target cell is combined with a neighboring cell that a train is about to head for. The combined cell may be considered as a logical cell. All cells in the combined cell cooperatively send the data to the UEs in the high-speed movement state, so that the UEs in the high-speed movement state do not require a cell handover in the combined cell. A cell in which the UEs in the high-speed movement state are currently located and a cell that the train is about to arrive at are combined in advance, so as to combine the cells before the train arrives at the cell. In this way, the train seems to be always in one logical cell when the train is driving, implementing no handover in the entire journey on the high-speed railway. In this case, it is equivalent that a capacity of only the combined cell is reduced, and a cell that is not combined can still accommodate a terrestrial user and remain an original cell capacity, thereby increasing a capacity of cells along the high-speed transportation line, avoiding a capacity bottleneck caused in a super cell by combining all cells along the high-speed transportation line in the entire journey. Preferably, when the preset quantity is 0, provided that it is determined that the target cell includes a UE in the high-speed movement state, cell combination is triggered, so that the UE in the high-speed movement state enjoys a no-handover service in the entire journey on the high-speed railway after the cell combination.

Further, the combined cell may be regularly separated, periodically separated, or separated in response to a trigger. For example, when the high-speed railway is idle, that is, when the quantity of the UEs in the high-speed movement state decreases to some degree, cells that have been combined may be separated in response to a trigger condition, to release a resource, thereby further increasing the capacity of the cells along the high-speed transportation line.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 3:
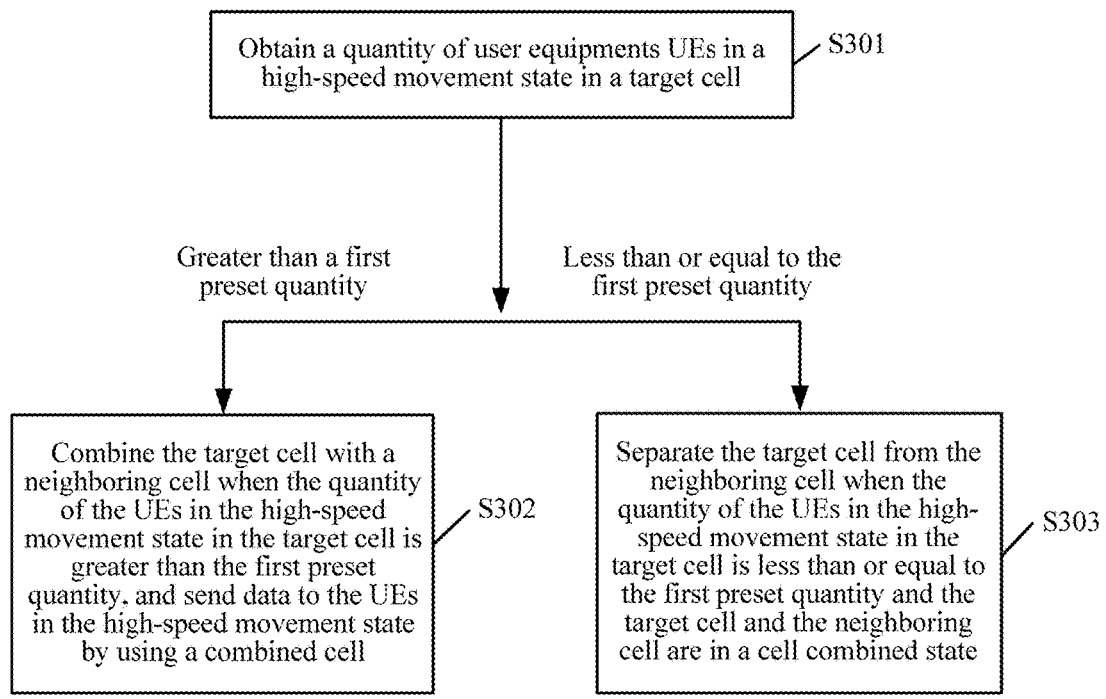
FIG. 3 is a schematic flowchart of another method for dynamically combining cells according to the present invention.

Referring to FIG. 3, FIG. 3 is a schematic flowchart of another method for dynamically combining cells according to an embodiment of the present invention. A description is provided below from a perspective of a network device side with reference to FIG. 3. As shown in FIG. 3, the method may include the following step S301 to step S303.

Step S301: Obtain a quantity of user equipments UEs in a high-speed movement state in a target cell.

Step S302: Combine the target cell with the neighboring cell when the quantity of the UEs in the high-speed movement state in the target cell is greater than a first preset quantity, and send data to the UEs in the high-speed movement state by using a combined cell.

Specifically, for step S301 and step S302, refer to step S201 and step S202 in the embodiment in FIG. 2. Details are not described herein again.

Step S303: Separate the target cell from the neighboring cell when the quantity of the UEs in the high-speed movement state in the target cell is less than or equal to the first preset quantity and the target cell and the neighboring cell are in a cell combined state.

Specifically, when the quantity of the UEs in the high-speed movement state in the target cell is less than or equal to the first preset quantity and the target cell and the neighboring cell are combined, the target cell and the neighboring cell are separated. It can be understood that step S303 may be performed after step S302, or may be performed before S302. For example, an initial state between cells along a high-speed transportation line or between a target cell and a neighboring cell is a combined state. In this case, determining is performed by using a network device, for example, a base station, corresponding to each target cell. When it is determined that a condition that the quantity of the UEs in the high-speed movement state in the target cell is less than or equal to the first preset quantity is satisfied, that the target cell and the neighboring cell do not need to be in the combined state may be determined. In this case, the corresponding target cell and neighboring cell may be controlled to be separated, so as to release a cell resource and support an ordinary terrestrial user, that is, a UE in a low-speed movement state, thereby further increasing a capacity of the cells along the high-speed transportation line.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 4:
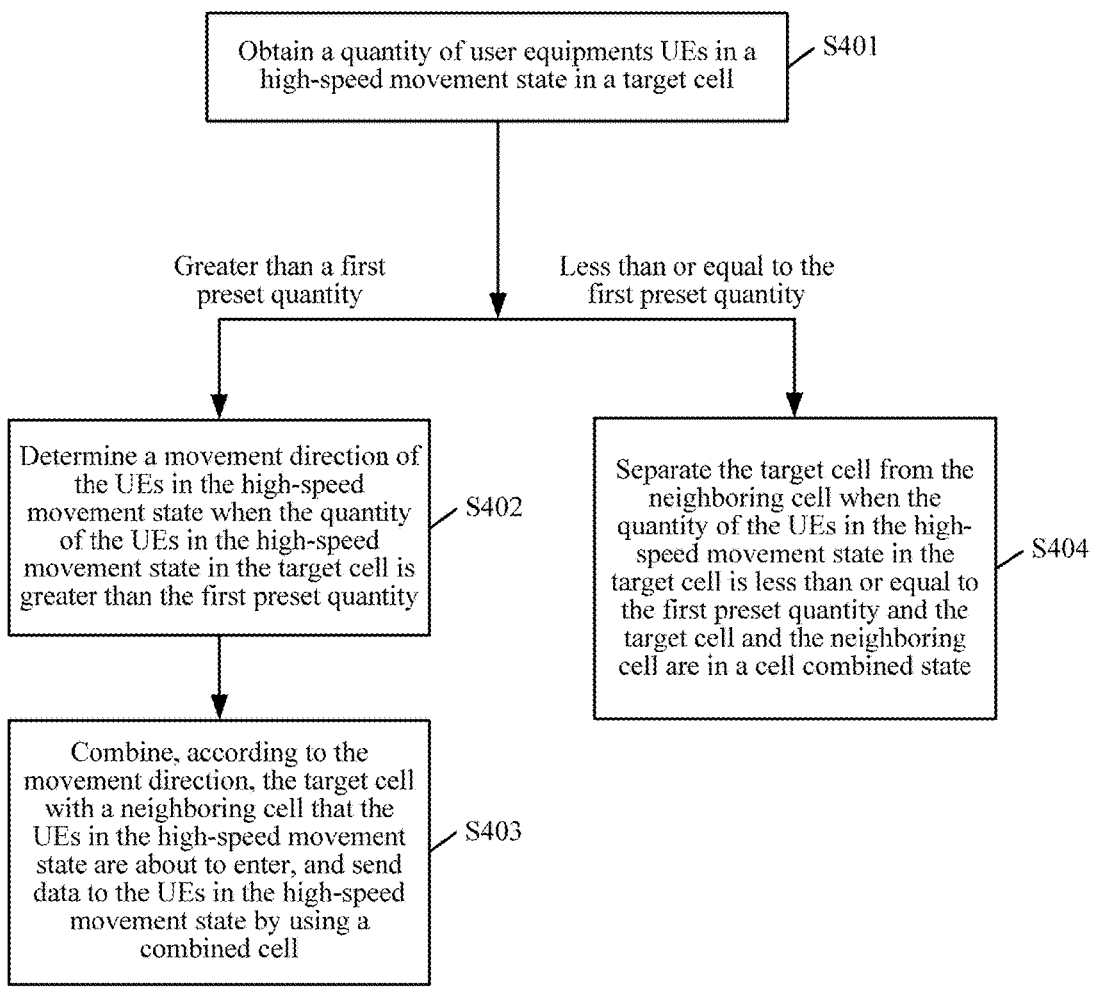
FIG. 4 is a schematic flowchart of still another method for dynamically combining cells according to the present invention.

Referring to FIG. 4, FIG. 4 is a schematic flowchart of still another method for dynamically combining cells according to an embodiment of the present invention. A description is provided below from a perspective of a network device side with reference to FIG. 4. As shown in FIG. 4, the method may include the following step S401 to step S404.

Step S401: Obtain a quantity of user equipments UEs in a high-speed movement state in a target cell.

Specifically, for step S401, refer to step S201 in the embodiment in FIG. 2. Details are not described herein again.

Step S402: Determine a movement direction of the UEs in the high-speed movement state when the quantity of the UEs in the high-speed movement state in the target cell is greater than a first preset quantity.

Specifically, when it is detected that the quantity of the UEs in the high-speed movement state in the target cell is greater than the first preset quantity, a trigger condition for cell combination is satisfied. However, because the target cell has two neighboring cells respectively at the left and right sides, and one train can drive towards only one direction at a moment, if both of the neighboring cells are used for combination, a resource is wasted in a neighboring cell that the train does not arrive at. Therefore, a driving direction of the train needs to be determined, that is, a movement direction of user equipment on the train, that is, the UEs in the high-speed movement state, needs to be determined. The movement direction of the UEs in the high-speed movement state may be determined according to a cell handover history record or a cell combination history record of the UEs in the high-speed movement state.

Further, to determine the movement direction of the UEs in the high-speed movement state, a cell handover history record of the UEs in the high-speed movement state may be obtained, and the movement direction of the UEs may be determined according to the cell handover history record. Alternatively, a unique identifier of a neighboring cell with which the target cell is combined last time may be obtained, and the movement direction of the UEs in the high-speed movement state may be determined and predicted according to a unique identifier of the target cell and the obtained unique identifier of the neighboring cell. The unique identifier is a numeric identifier that sequentially marks each cell along a high-speed transportation line. It can be understood that in an initial state, a cell handover history record or a cell combination history record of the UEs in the high-speed movement state may not be formed. Therefore, a situation in which there is no history record needs to be ignored, and the foregoing step of determining the movement direction can be performed only after the cell handover or cell combination history record of the UEs is generated.

Step S403: Combine, according to the movement direction, the target cell with a neighboring cell that the UEs in the high-speed movement state are about to enter, and send data to the UEs in the high-speed movement state by using a combined cell.

Specifically, the target cell is combined with the neighboring cell that the UEs in the high-speed movement state are about to enter according to the movement direction determined in step S402. Preferably, the combination may be implemented by changing respective physical cell identifiers PCIs of the target cell and the neighboring cell into a preset PCI together, and configuring a parameter for the target cell and the neighboring cell according to a preset cell combination rule. More specifically, a switch that is mutually exclusive with a characteristic algorithm of a super cell may be disabled, and a fixed parameter of the combined cell is configured according to a requirement of the super cell. It should be noted that in this embodiment of the present invention, the preset PCI needs to be set in advance. That is, the preset PCI is always used for cell combination in the entire journey. Because a quantity of PCIs is limited, a rule specifying that the preset PCI is not the same as or does not conflict with PCIs of the cells along the high-speed transportation line needs to be satisfied. Otherwise, an error may occur in cell combination.

Step S404: Separate the target cell from the neighboring cell when the quantity of the UEs in the high-speed movement state in the target cell is less than or equal to the first preset quantity and the target cell and the neighboring cell are in a cell combined state.

Specifically, when the quantity of the UEs in the high-speed movement state in the target cell is less than or equal to the first preset quantity and the target cell and the neighboring cell are in the cell combined state, the preset PCI into which the PCI of the target cell is changed is restored to a PCI that exists before the cell combination, and the parameter configured for the target cell according to the preset cell combination rule is restored to a parameter that exists before the cell combination. Further, both a related algorithm and the fixed parameter are restored to statuses that exist before the cell combination.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 5:
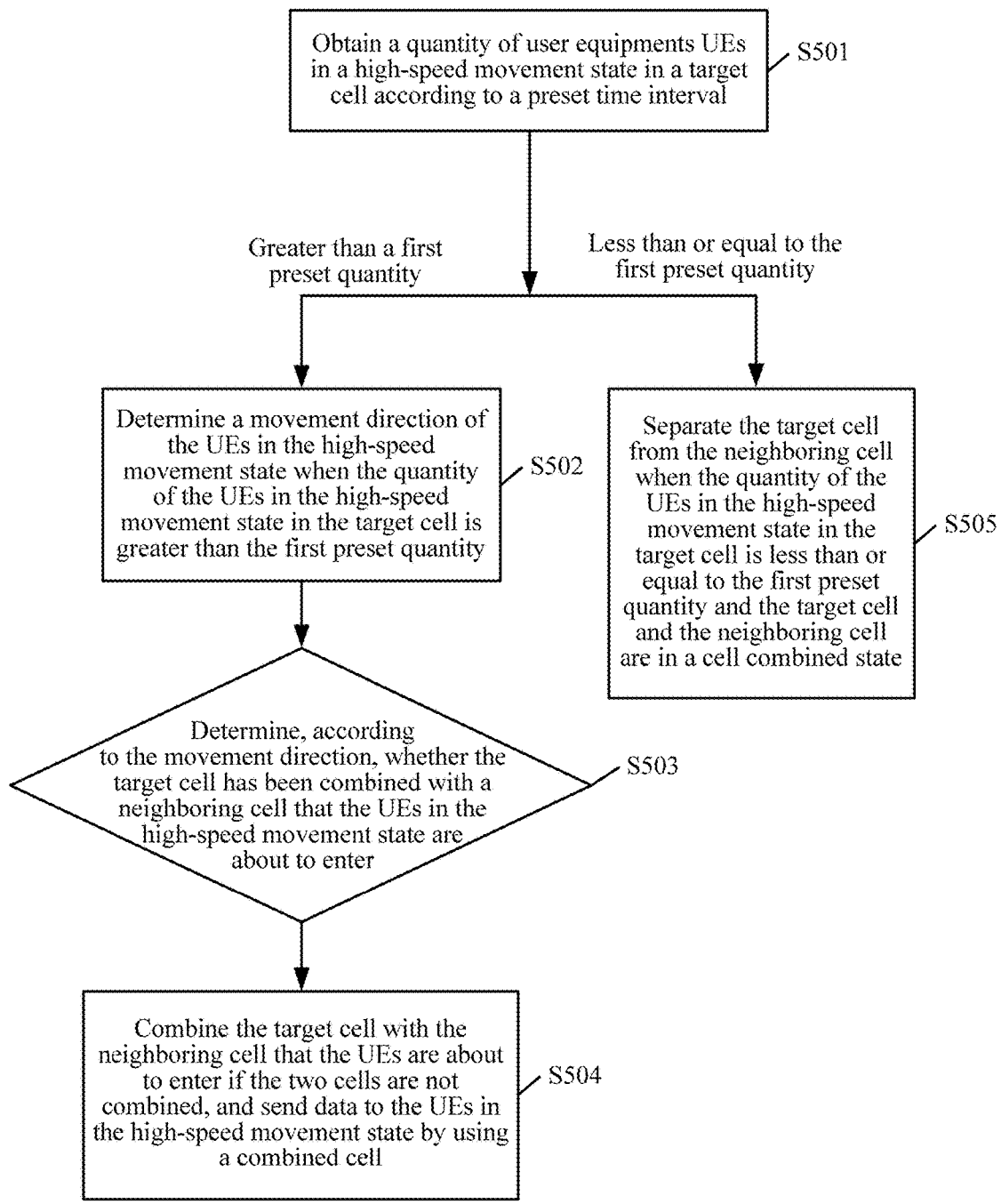
FIG. 5 is a schematic flowchart of still another method for dynamically combining cells according to the present invention.

Referring to FIG. 5, FIG. 5 is a schematic flowchart of still another method for dynamically combining cells according to an embodiment of the present invention. A description is provided below from a perspective of a network device side with reference to FIG. 5. As shown in FIG. 5, the method may include the following step S501 to step S505.

Step S501: Obtain a quantity of user equipments UEs in a high-speed movement state in a target cell according to a preset time interval.

Specifically, the quantity of the UEs in the high-speed movement state in the target cell is obtained in real time or is periodically obtained according to the preset time interval, so as to circularly and coherently perform the following step of cell combination or cell separation in this embodiment of the present invention. It can be understood that the preset time interval may be correspondingly adjusted according to different application scenarios, or may be dynamically adjusted with reference to a railroad train schedule. For example, during busy time, the preset time interval is adjusted shorter; during idle time, the preset time interval may be properly adjusted longer, to better save expenses. More specifically, refer to step S201 in the embodiment in FIG. 2. Details are not described herein again.

Step S502: Determine a movement direction of the UEs in the high-speed movement state when the quantity of the UEs in the high-speed movement state in the target cell is greater than a first preset quantity.

Specifically, for step S502, refer to step S402 in the embodiment in FIG. 4. Details are not described herein again.

Step S503: Determine, according to the movement direction, whether the target cell has been combined with a neighboring cell that the UEs in the high-speed movement state are about to enter.

Specifically, before cell combination, whether the target cell has been combined with the neighboring cell that the UEs in the high-speed movement state are about to enter is specifically determined according to the movement direction. If the two cells have been combined, the following step of cell combination is not performed.

Step S504: Combine the target cell with the neighboring cell that the UEs are about to enter if the two cells are not combined, and send data to the UEs in the high-speed movement state by using a combined cell.

Specifically, if a determining result is that the two cells are not combined, the target cell is combined, according to the movement direction determined in step S502, with the neighboring cell that the UEs are about to enter. More specifically, refer to step S403 in the embodiment in FIG. 4. Details are not described herein again.

Step S505: Separate the target cell from the neighboring cell when the quantity of the UEs in the high-speed movement state in the target cell is less than or equal to the first preset quantity and the target cell and the neighboring cell are in a cell combined state.

Specifically, for step S505, refer to step S404 in the embodiment in FIG. 4. Details are not described herein again.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 6:
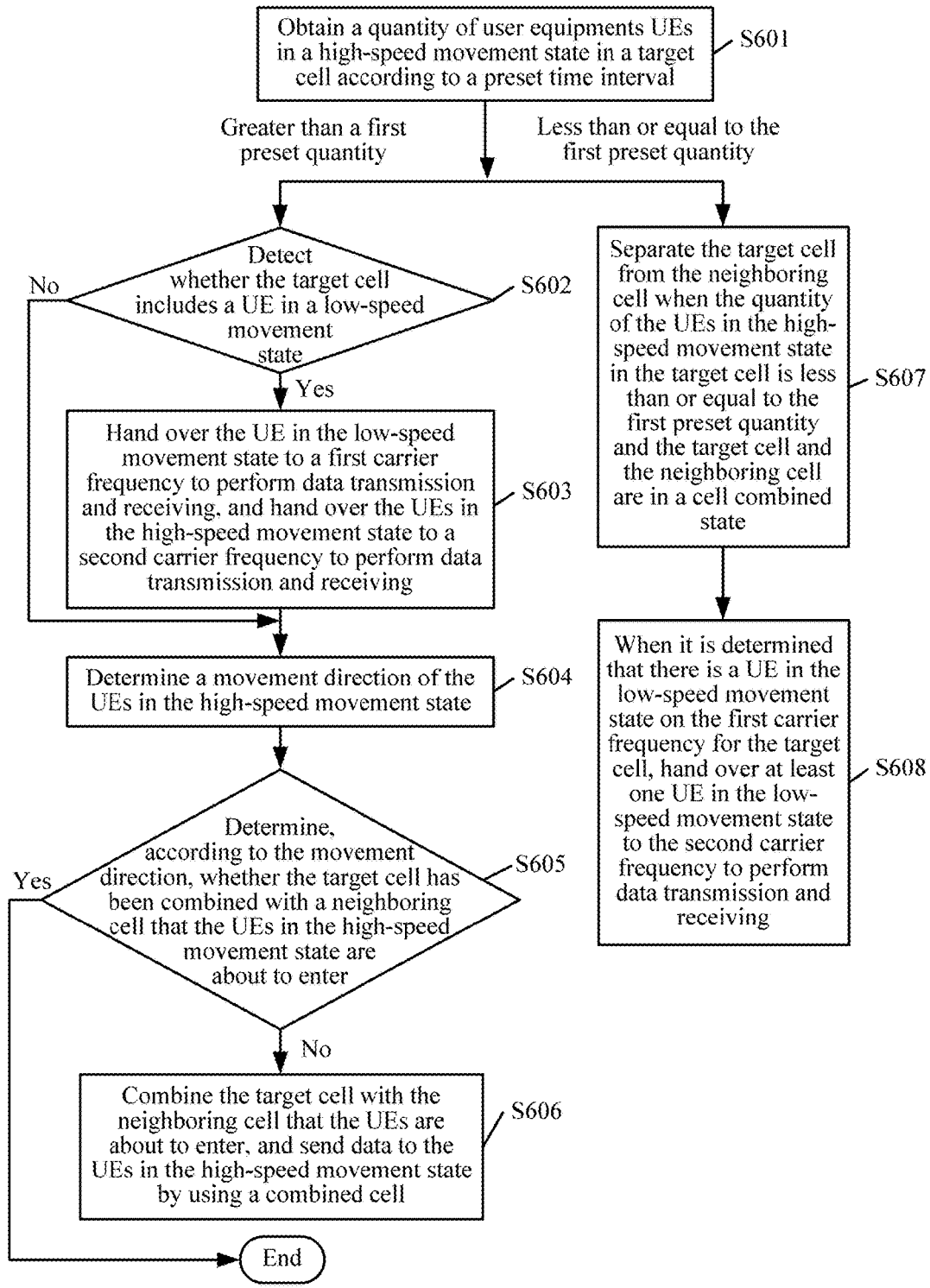
FIG. 6 is a schematic flowchart of still another method for dynamically combining cells according to the present invention.

Referring to FIG. 6, FIG. 6 is a schematic flowchart of still another method for dynamically combining cells according to an embodiment of the present invention. A description is provided below from a perspective of a network device side with reference to FIG. 6. As shown in FIG. 6, the method may include the following step S601 to step S608.

Step S601: Obtain a quantity of user equipments UEs in a high-speed movement state in a target cell according to a preset time interval.

Specifically, for step S601, refer to step S501 in the embodiment in FIG. 5. Details are not described herein again.

Step S602: Detect whether the target cell includes a UE in a low-speed movement state when the quantity of the UEs in the high-speed movement state in the target cell is greater than a first preset quantity.

Specifically, whether the target cell includes a UE in a low-speed movement state is detected when the quantity of the UEs in the high-speed movement state in the target cell is greater than the first preset quantity. The UE in the low-speed movement state is a UE that is in a connected mode and whose movement speed is less than a preset threshold. More specifically, for a method for determining whether a UE is in the low-speed movement state, correspondingly refer to the method for determining the speed of the UE in the connected mode in step S201 in the embodiment in FIG. 2. Details are not described herein again.

Step S603: If the target cell includes the UE in the low-speed movement state, hand over the UE in the low-speed movement state to a first carrier frequency to perform data transmission and receiving, and hand over the UEs in the high-speed movement state to a second carrier frequency to perform data transmission and receiving.

Specifically, both the target cell and the neighboring cell support the first carrier frequency and the second carrier frequency. That is, both the target cell and the neighboring cell are dual-carrier-frequency coverage cells, and data transmission and receiving on the first carrier frequency and data transmission and receiving on the second carrier frequency do not affect each other. After subsequent cell combination is performed, a terrestrial user in a combined cell, that is, a UE in the low-speed movement state may be not affected by the combined cell, and perform data transmission and receiving still in a transmission mode before the cell combination. In this case, a cell that is not combined can support a terrestrial user, that is, a UE in the low-speed movement state; in addition, because transmission of the UEs in the high-speed movement state and transmission of the UE in the low-speed movement state do not interfere with each other by handing over the UE in the low-speed movement state to a carrier frequency different from that of the UEs in the high-speed movement state, the combined cell can support both the UEs in the high-speed movement state and the UE in the low-speed movement state. That is, all cells along an entire high-speed transportation line can support both the UEs in the high-speed movement state and the UE in the low-speed movement state in after step S603 is performed.

Step S604: Determine a movement direction of the UEs in the high-speed movement state.

Step S605: Determine, according to the movement direction, whether the target cell has been combined with a neighboring cell that the UEs in the high-speed movement state are about to enter.

Step S606: Combine the target cell with the neighboring cell that the UEs are about to enter if the two cells are not combined, and send data to the UEs in the high-speed movement state by using a combined cell.

Step S607: Separate the target cell from the neighboring cell when the quantity of the UEs in the high-speed movement state in the target cell is less than or equal to the first preset quantity and the target cell and the neighboring cell are in a cell combined state.

Specifically, for step S604 to step S607, refer to step S502 to step S505 in the embodiment in FIG. 5. Details are not described herein again.

Step S608: When it is determined that there is a UE in the low-speed movement state on the first carrier frequency for the target cell, hand over at least one UE in the low-speed movement state to the second carrier frequency to perform data transmission and receiving.

Specifically, because the quantity of the UEs in the high-speed movement state decreases, the combined cell satisfies a cell separation condition and is separated. In this case, it may be considered that the second carrier frequency for the target cell is in an idle state, and some users performing data transmission and receiving on the first carrier frequency may be handed over to the second carrier frequency, to reduce load on the first carrier frequency and make full use of a carrier frequency resource.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 7:
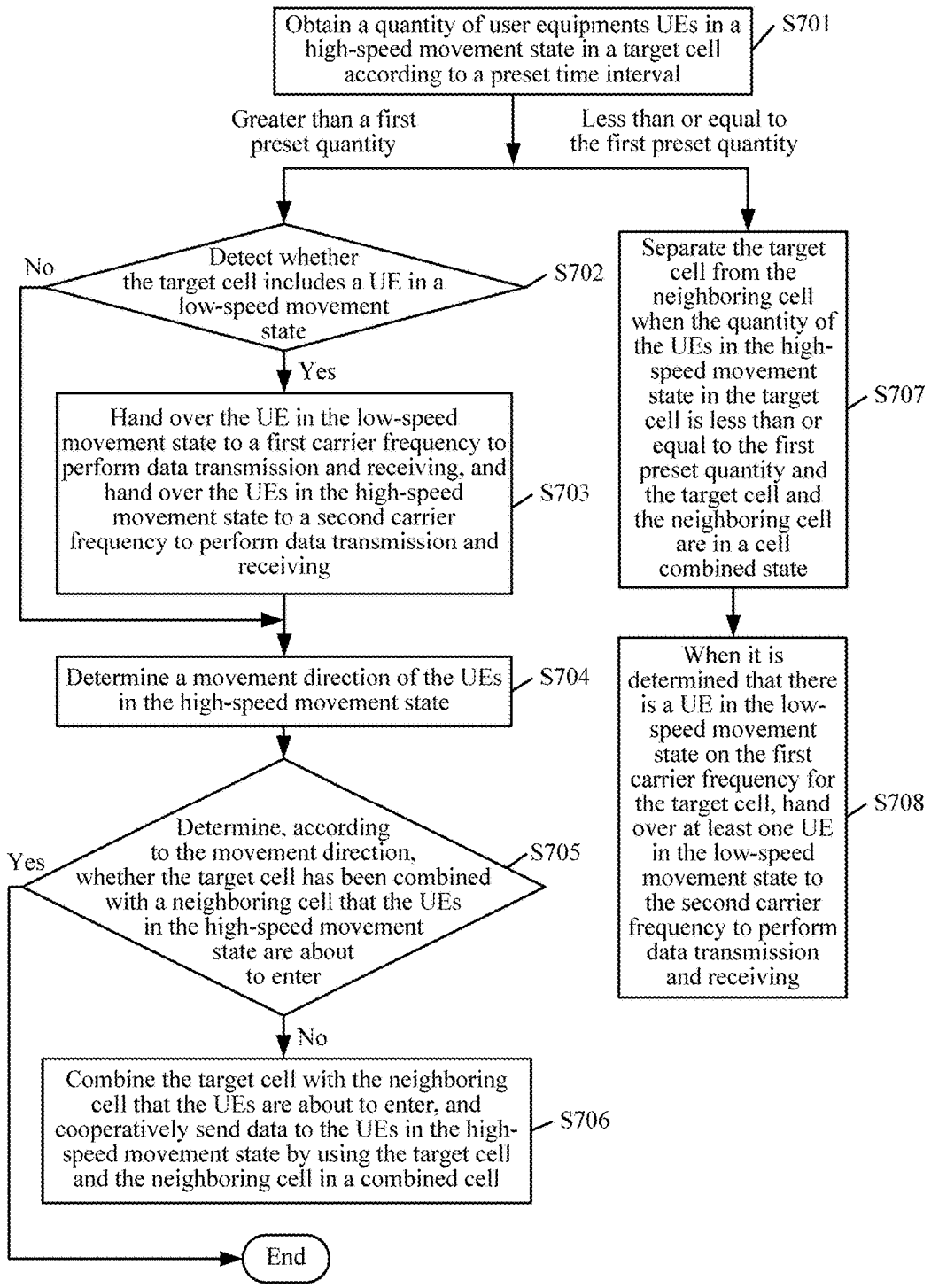
FIG. 7 is a schematic flowchart of still another method for dynamically combining cells according to the present invention.

Referring to FIG. 7, FIG. 7 is a schematic flowchart of still another method for dynamically combining cells according to an embodiment of the present invention. A description is provided below from a perspective of a network device side with reference to FIG. 7. As shown in FIG. 7, the method may include the following step S701 to step S708.

Step S701: Obtain a quantity of user equipments UEs in a high-speed movement state in a target cell according to a preset time interval.

Step S702: Detect whether the target cell includes a UE in a low-speed movement state when the quantity of the UEs in the high-speed movement state in the target cell is greater than a first preset quantity.

Step S703: If the target cell includes the UE in the low-speed movement state, hand over the UE in the low-speed movement state to the first carrier frequency to perform data transmission and receiving, and hand over the UEs in the high-speed movement state to the second carrier frequency to perform data transmission and receiving.

Step S704: Determine a movement direction of the UEs in the high-speed movement state.

Step S705: Determine, according to the movement direction, whether the target cell has been combined with a neighboring cell that the UEs in the high-speed movement state are about to enter.

Specifically, for step S701 to step S705, refer to step S601 to step S605 in the embodiment in FIG. 6. Details are not described herein again.

Step S706: Combine the target cell with the neighboring cell that the UEs are about to enter if the two cells are not combined, and cooperatively send data to the UEs in the high-speed movement state by using the target cell and the neighboring cell in a combined cell.

Specifically, the target cell is combined with the neighboring cell that the UEs are about to enter if a determining result in step S705 is that the two cells are not combined, and the data is cooperatively sent to the UEs in the high-speed movement state by using the target cell and the neighboring cell in the combined cell. The cooperatively sending data to the UEs in the high-speed movement state means sending the data to the UEs in the high-speed movement state in a coordinated multipoint (CoMP) transmission mode. According to CoMP, antennas of multiple cell sites including a target cell and a neighboring cell perform receiving or transmission in a coordinated manner, to improve received signal quality of a UE or a network device, thereby implementing no handover of the UE in a combined cell.

Step S707: Separate the target cell from the neighboring cell when the quantity of the UEs in the high-speed movement state in the target cell is less than or equal to the first preset quantity and the target cell and the neighboring cell are in a cell combined state.

Step S708: When it is determined that there is a UE in the low-speed movement state on the first carrier frequency for the target cell, hand over at least one UE in the low-speed movement state to the second carrier frequency to perform data transmission and receiving.

Specifically, for step S707 to S708, refer to step S607 and step S608 in the embodiment in FIG. 6. Details are not described herein again.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 8A:
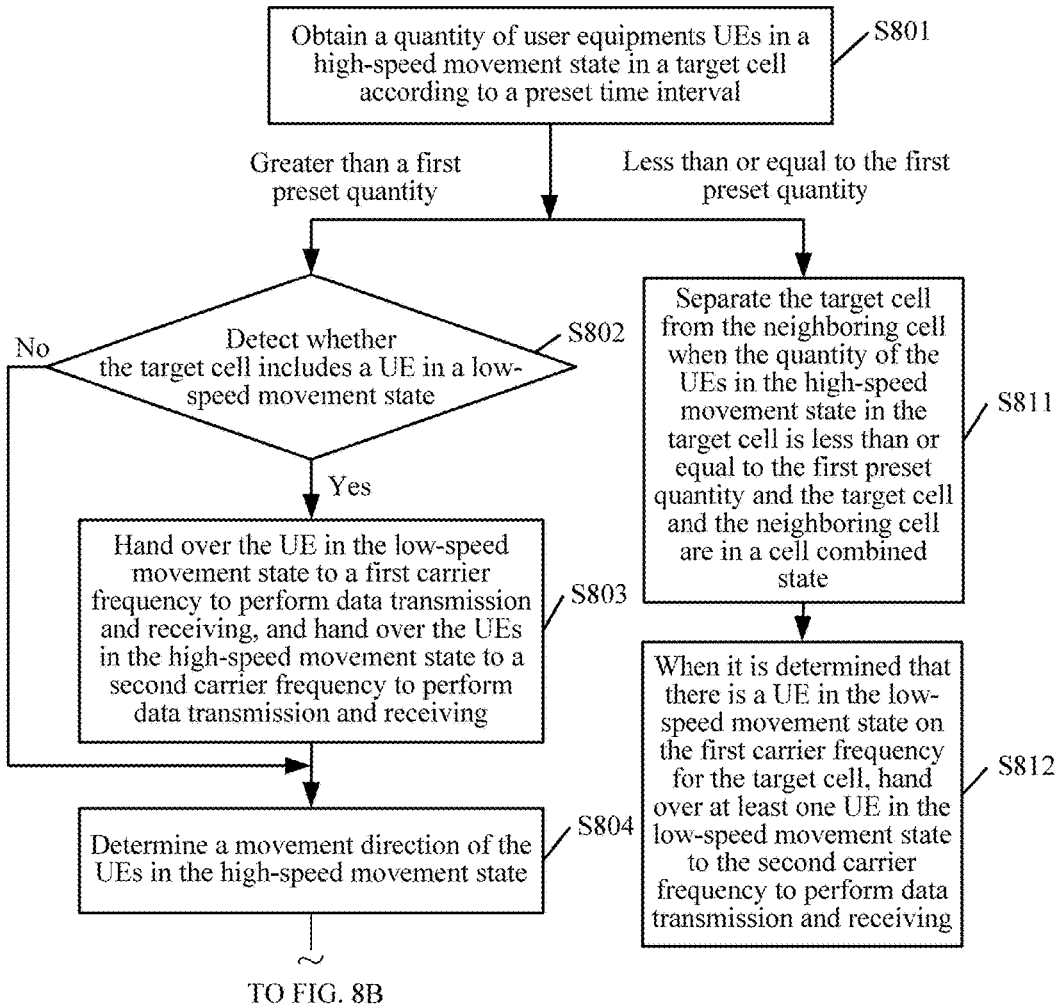
FIG. 8A and FIG. 8B are a schematic flowchart of still another method for dynamically combining cells according to the present invention.
Figure 8B:
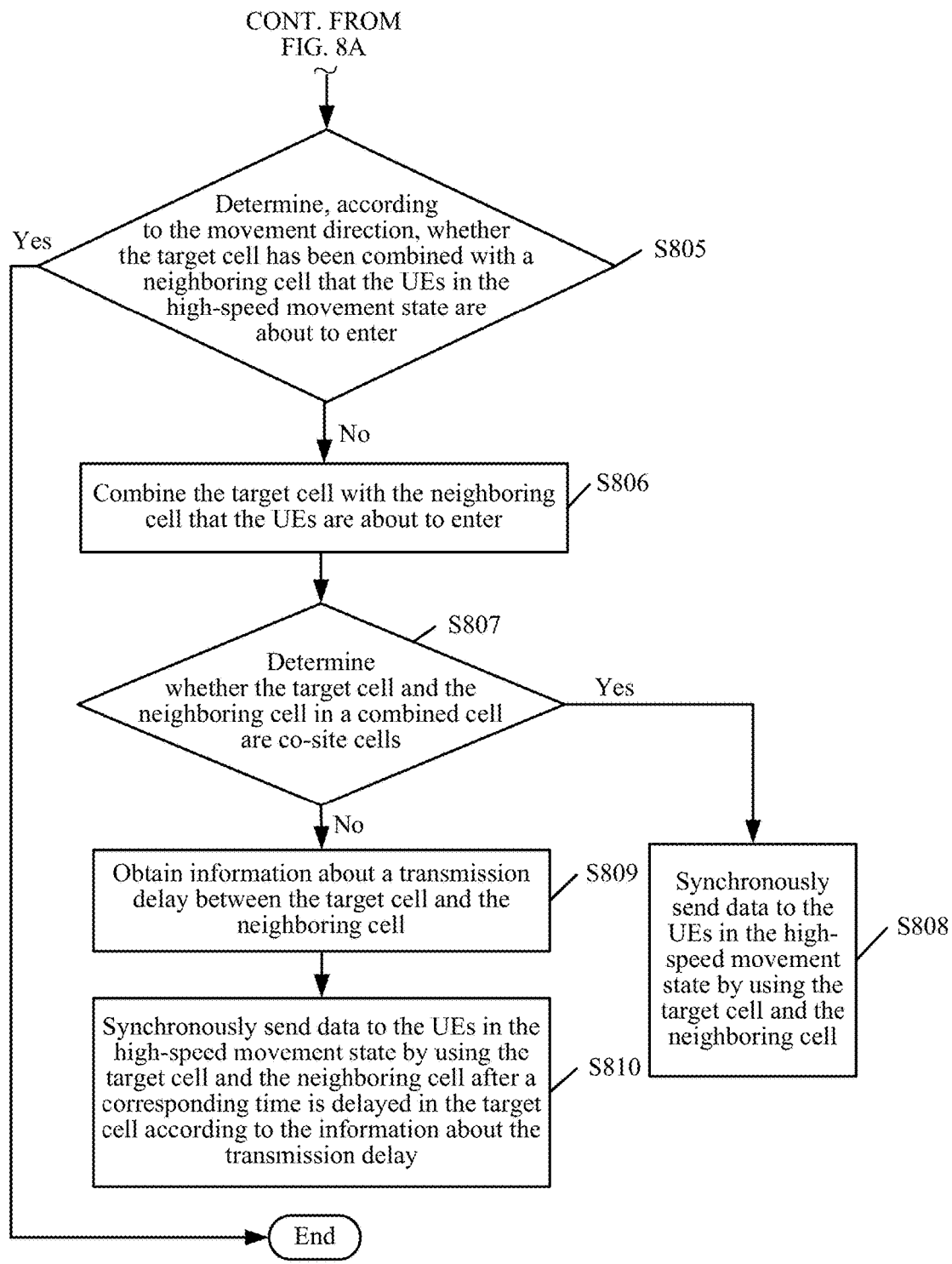

Referring to FIG. 8A and FIG. 8B, FIG. 8A and FIG. 8B are a schematic flowchart of still another method for dynamically combining cells according to an embodiment of the present invention. A description is provided below from a perspective of a network device side with reference to FIG. 8A and FIG. 8B. As shown in FIG. 8A and FIG. 8B, the method may include the following step S801 to step S812.

Step S801: Obtain a quantity of user equipments UEs in a high-speed movement state in a target cell according to a preset time interval.

Step S802: Detect whether the target cell includes a UE in a low-speed movement state when the quantity of the UEs in the high-speed movement state in the target cell is greater than a first preset quantity.

Step S803: If the target cell includes the UE in the low-speed movement state, hand over the UE in the low-speed movement state to the first carrier frequency to perform data transmission and receiving, and hand over the UEs in the high-speed movement state to the second carrier frequency to perform data transmission and receiving.

Step S804: Determine a movement direction of the UEs in the high-speed movement state.

Step S805: Determine, according to the movement direction, whether the target cell has been combined with a neighboring cell that the UEs in the high-speed movement state are about to enter.

Step S806: Combine the target cell with the neighboring cell that the UEs are about to enter if the two cells are not combined.

Specifically, for step S801 to step S806, refer to step S701 to S706 in the embodiment in FIG. 7. Details are not described herein again.

Step S807: Determine whether the target cell and the neighboring cell in a combined cell are co-site cells.

Specifically, when cells along a high-speed transportation line in this embodiment of the present invention use IP radio access network (IPRAN) networking, a transmission delay corresponding to the networking is relatively large, and problems such as a data transmission error and a cell handover failure are caused when data cannot be synchronously sent to the UEs in the high-speed movement state by using the target cell and the neighboring cell in the combined cell. Therefore, in a process of sending the data to the UEs in the high-speed movement state by using the combined cell, a delay factor should be fully considered. In addition, because cells of different sites have a relatively large data transmission delay, whether the target cell and the neighboring cell are co-site cells needs to be determined. When a network architecture including a BBU and an RRU is applied to this embodiment of the present invention, cells corresponding to RRUs of different BBUs are cells of different sites, and different cells corresponding to RRUs of one BBU are co-site cells. It can be understood that this embodiment of the present invention is not limited to the IPRAN networking, and for any networking requiring a relatively large transmission delay or requiring considering a delay factor during data transmission, the steps of the method in this embodiment of the present invention may be performed.

Step S808: Synchronously send data to the UEs in the high-speed movement state by using the target cell and the neighboring cell if the two cells are co-site cells.

Specifically, if it is determined that the two cells are co-site cells, it may be considered that there is no transmission delay. In this case, the data may be synchronously sent to the UEs in the high-speed movement state by using the target cell and the neighboring cell. More specifically, refer to step S706 in the embodiment in FIG. 7. Details are not described herein again.

Step S809: Obtain information about a transmission delay between the target cell and the neighboring cell if the two cells are not co-site cells.

Specifically, data transmission between cells of different sites causes a particular delay. Therefore, to cooperatively send the data to the UEs by using the target cell and the neighboring cell, information about the delay needs to be obtained.

Step S810: Synchronously send data to the UEs in the high-speed movement state by using the target cell and the neighboring cell after a corresponding time is delayed in the target cell according to the information about the transmission delay.

Specifically, for the UEs in the high-speed movement state in the target cell, the delay time obtained in step S809 can be delayed in the target cell, and the data is synchronously sent to the UEs in the high-speed movement state by using the target cell and the neighboring cell.

Step S811: Separate the target cell from the neighboring cell when the quantity of the UEs in the high-speed movement state in the target cell is less than or equal to the first preset quantity and the target cell and the neighboring cell are in a cell combined state.

Step S812: When it is determined that there is a UE in the low-speed movement state on the first carrier frequency for the target cell, hand over at least one UE in the low-speed movement state to the second carrier frequency to perform data transmission and receiving.

Specifically, for step S811 and step S812, refer to step S707 and step S708 in the embodiment in FIG. 7. Details are not described herein again.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 9A:
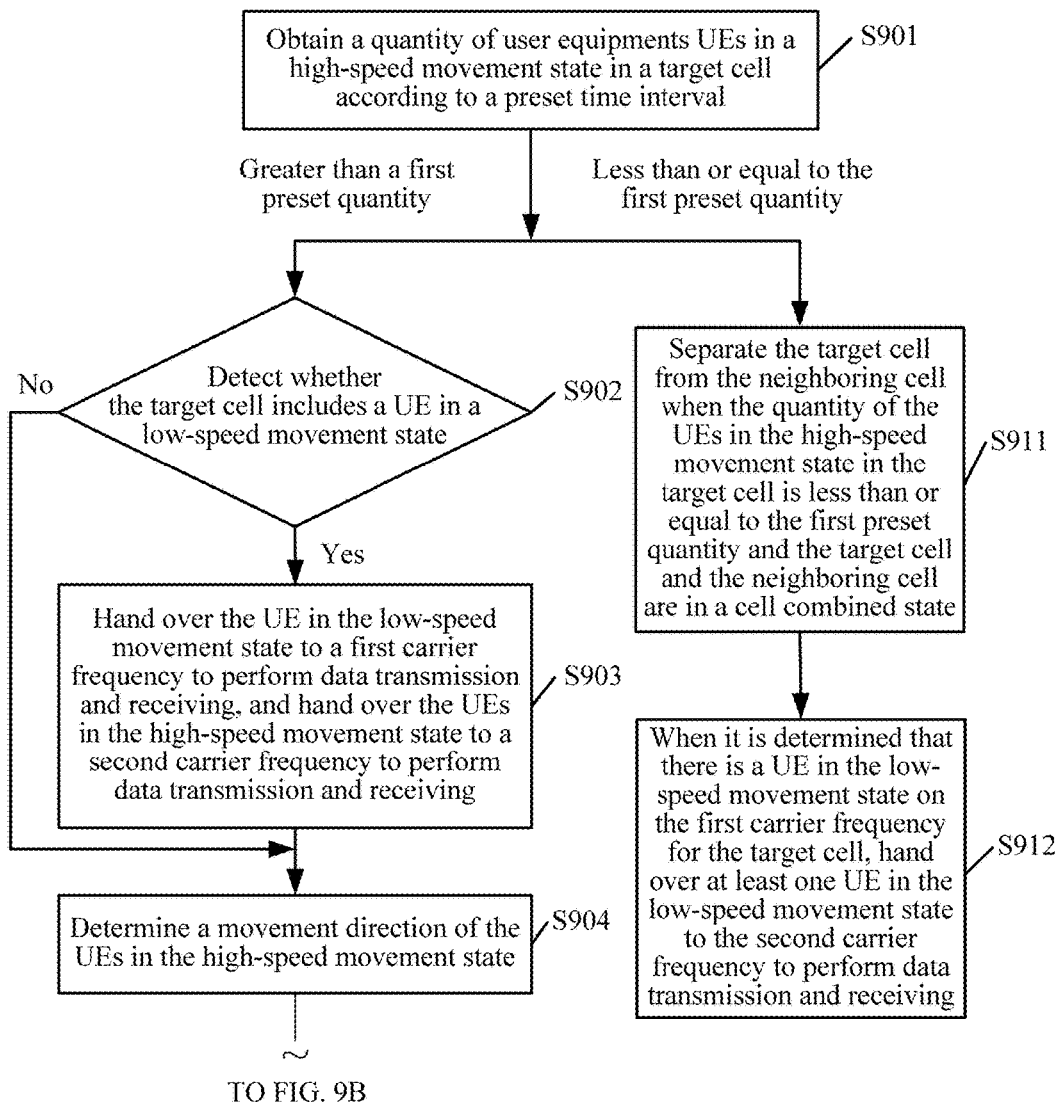
FIG. 9A and FIG. 9B are a schematic flowchart of still another method for dynamically combining cells according to the present invention.
Figure 9B:
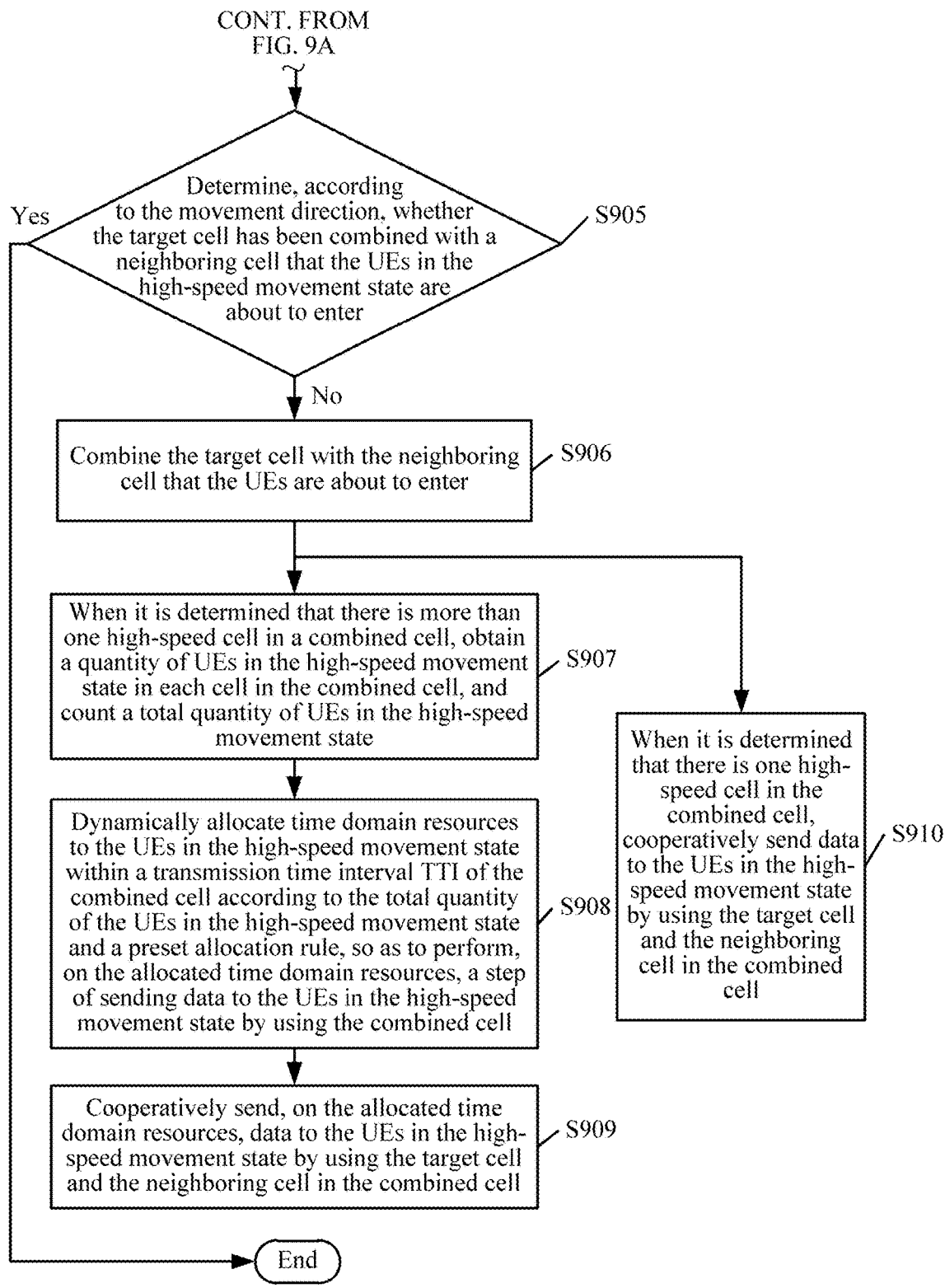

Referring to FIG. 9A and FIG. 9B, FIG. 9A and FIG. 9B are a schematic flowchart of still another method for dynamically combining cells according to an embodiment of the present invention. A description is provided below from a perspective of a network device side with reference to FIG. 9A and FIG. 9B. As shown in FIG. 9A and FIG. 9B, the method may include the following step S901 to step S912.

Step S901: Obtain a quantity of user equipments UEs in a high-speed movement state in a target cell according to a preset time interval.

Step S902: Detect whether the target cell includes a UE in a low-speed movement state when the quantity of the UEs in the high-speed movement state in the target cell is greater than a first preset quantity.

Step S903: If the target cell includes the UE in the low-speed movement state, hand over the UE in the low-speed movement state to the first carrier frequency to perform data transmission and receiving, and hand over the UEs in the high-speed movement state to the second carrier frequency to perform data transmission and receiving.

Step S904: Determine a movement direction of the UEs in the high-speed movement state.

Step S905: Determine, according to the movement direction, whether the target cell has been combined with a neighboring cell that the UEs in the high-speed movement state are about to enter.

Step S906: Combine the target cell with the neighboring cell that the UEs are about to enter if the two cells are not combined.

Specifically, for step S901 to step S906, refer to step S801 to step S806 in the embodiment in FIG. 8A and FIG. 8B. Details are not described herein again.

Step S907: When it is determined that there is more than one high-speed cell in a combined cell, obtain a quantity of UEs in the high-speed movement state in each cell in the combined cell, and count a total quantity of UEs in the high-speed movement state.

Specifically, the high-speed cell is a cell, in the combined cell, in which a quantity of UEs in the high-speed movement state is greater than a second preset quantity. All cells in the combined cell need to simultaneously send same data to a same UE, but a cell in the combined cell cannot learn existence of a UE in the high-speed movement state in another cell that is determined as a high-speed cell. Therefore, when a train is within a coverage area of multiple cells at a moment, and more than one cell includes a quantity of UEs that are in the high-speed movement state, where the quantity is greater than the second preset quantity, there is a conflict in allocating a channel resource, for example, a conflict between a physical downlink control channel (PDCCH) and a physical downlink shared channel (PDSCH). In this case, channel resources need to be coordinately allocated. Preferably, each cell in the combined cell may be instructed to collect statistics on a quantity of UEs in the high-speed movement state in the cell, and to report the quantity to a preset network device together, for example, report the quantity to a network device corresponding to a cell with a maximum or minimum cell CGI, so as to count a total quantity. Preferably, the second preset quantity is 0.

Step S908: Dynamically allocate time domain resources to the UEs in the high-speed movement state within a transmission time interval TTI of the combined cell according to the total quantity of the UEs in the high-speed movement state and a preset allocation rule, so as to perform, on the allocated time domain resources, a step of sending data to the UEs in the high-speed movement state by using the combined cell.

Specifically, the time domain resources are dynamically allocated to the UEs in the high-speed movement state within the TTI according to the total quantity of the UEs in the high-speed movement state that is counted in step S907, the transmission time interval (TTI) of the combined cell, and the preset allocation rule. For example, the time domain resources are allocated according to a rule such as preferably allocating a resource to a cell including more UEs in the high-speed movement state or allocating resources in sequence according to values of unique identifiers of cells. In this way, the step of sending data to the UEs in the high-speed movement state by using the combined cell is performed on the allocated time domain resources.

Step S909: Cooperatively send, on the allocated time domain resources, data to the UEs in the high-speed movement state by using the target cell and the neighboring cell in the combined cell.

Specifically, the data is cooperatively sent, on the time domain resources allocated in step S908, to the UEs in the high-speed movement state by using the target cell and the neighboring cell in the combined cell. More specifically, refer to step S706 in the embodiment in FIG. 7. Details are not described herein again.

Step S910: When it is determined that there is one high-speed cell in the combined cell, cooperatively send data to the UEs in the high-speed movement state by using the target cell and the neighboring cell in the combined cell.

Specifically, for step S910, refer to step S706 in the embodiment in FIG. 7. Details are not described herein again.

Step S911: Separate the target cell from the neighboring cell when the quantity of the UEs in the high-speed movement state in the target cell is less than or equal to the first preset quantity and the target cell and the neighboring cell are in a cell combined state.

Step S912: When it is determined that there is a UE in the low-speed movement state on the first carrier frequency for the target cell, hand over at least one UE in the low-speed movement state to the second carrier frequency to perform data transmission and receiving.

Specifically, for step S911 and step S912, refer to step S811 and step S812 in the embodiment in FIG. 8A and FIG. 8B. Details are not described herein again.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 10A:
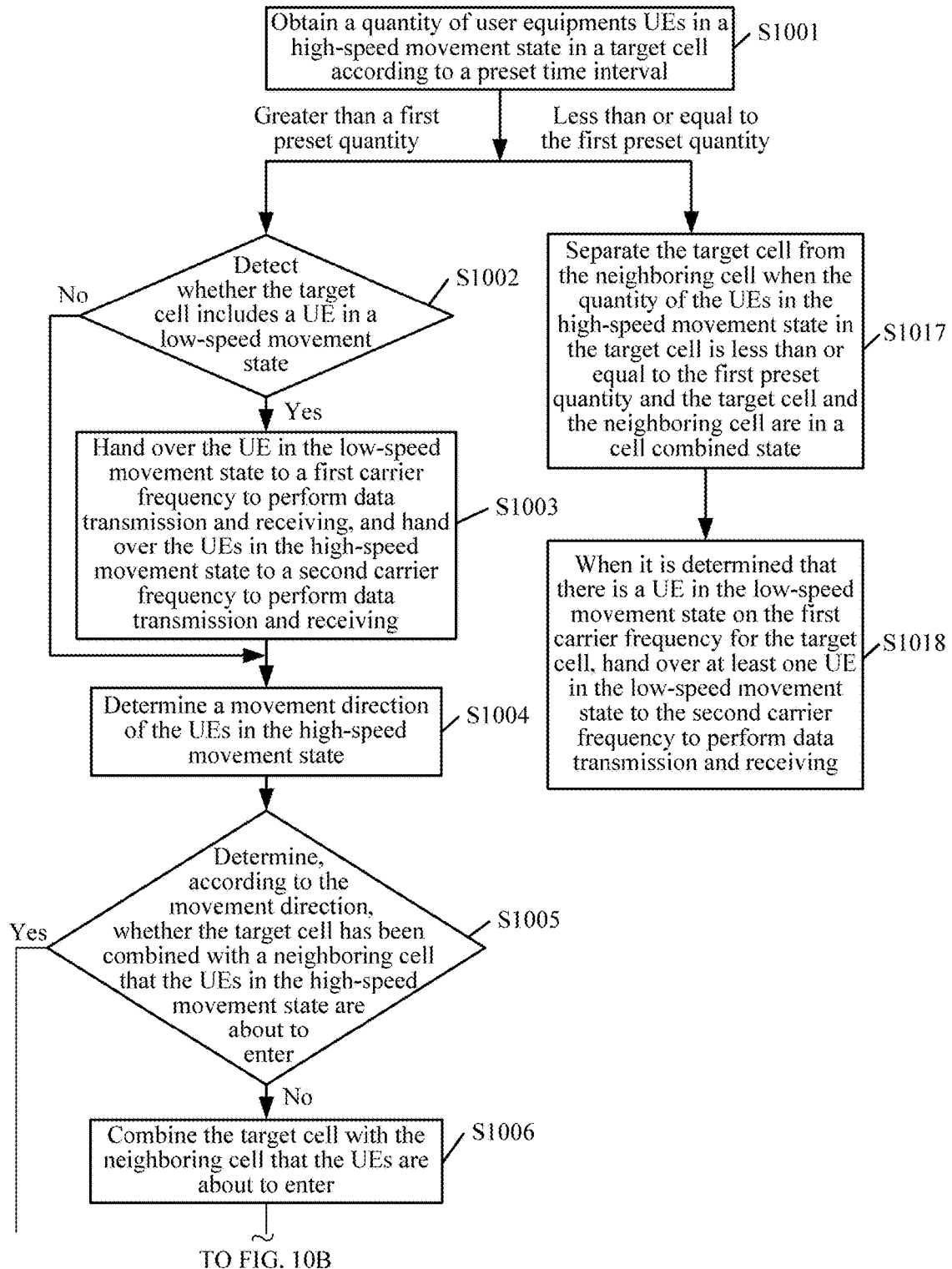
FIG. 10A and FIG. 10B are a schematic flowchart of still another method for dynamically combining cells according to the present invention.
Figure 10B:
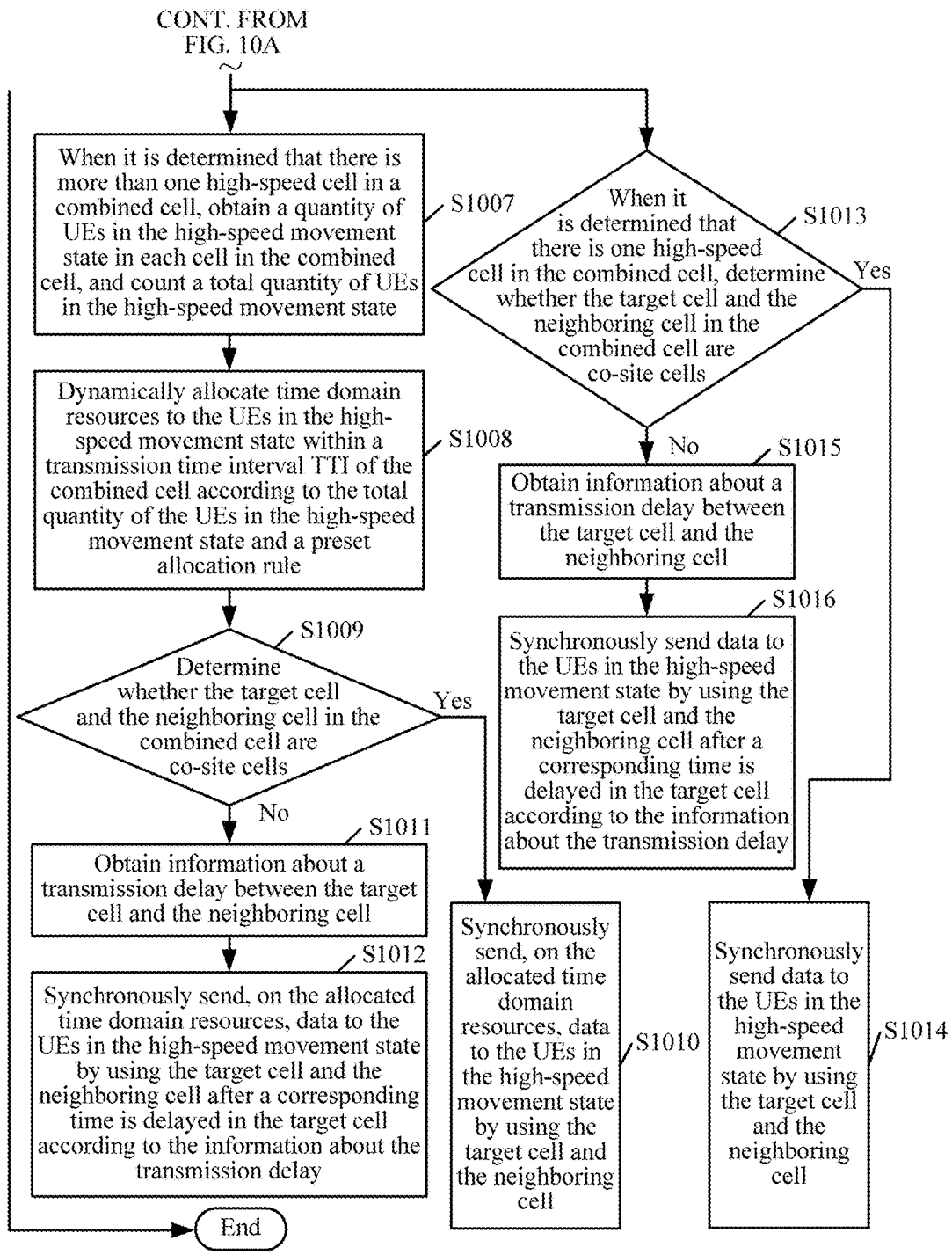

Referring to FIG. 10A and FIG. 10B, FIG. 10A and FIG. 10B are a schematic flowchart of still another method for dynamically combining cells according to an embodiment of the present invention. A description is provided below from a perspective of a network device side with reference to FIG. 10A and FIG. 10B. As shown in FIG. 10A and FIG. 10B, the method may include the following step S1001 to step S1018.

Step S1001: Obtain a quantity of user equipments UEs in a high-speed movement state in a target cell according to a preset time interval.

Step S1002: Detect whether the target cell includes a UE in a low-speed movement state when the quantity of the UEs in the high-speed movement state in the target cell is greater than a first preset quantity.

Step S1003: If the target cell includes the UE in the low-speed movement state, hand over the UE in the low-speed movement state to the first carrier frequency to perform data transmission and receiving, and hand over the UEs in the high-speed movement state to the second carrier frequency to perform data transmission and receiving.

Step S1004: Determine a movement direction of the UEs in the high-speed movement state.

Step S1005: Determine, according to the movement direction, whether the target cell has been combined with a neighboring cell that the UEs in the high-speed movement state are about to enter.

Step S1006: Combine the target cell with the neighboring cell that the UEs are about to enter if the two cells are not combined.

Step S1007: When it is determined that there is more than one high-speed cell in a combined cell, obtain a quantity of UEs in the high-speed movement state in each cell in the combined cell, and count a total quantity of UEs in the high-speed movement state.

Step S1008: Dynamically allocate time domain resources to the UEs in the high-speed movement state within a transmission time interval TTI of the combined cell according to the total quantity of the UEs in the high-speed movement state and a preset allocation rule.

Specifically, for step S1001 to step S1008, refer to step S901 to step S908 in the embodiment in FIG. 9A and FIG. 9B. Details are not described herein again.

Step S1009: Determine whether the target cell and the neighboring cell in the combined cell are co-site cells.

Step S1010: Synchronously send, on the allocated time domain resources, data to the UEs in the high-speed movement state by using the target cell and the neighboring cell if the two cells are co-site cells.

Step S1011: Obtain information about a transmission delay between the target cell and the neighboring cell if the two cells are not co-site cells.

Step S1012: Synchronously send, on the allocated time domain resources, data to the UEs in the high-speed movement state by using the target cell and the neighboring cell after a corresponding time is delayed in the target cell according to the information about the transmission delay.

Specifically, for step S1009 and step S1012, refer to step S807 to step S810 in the embodiment in FIG. 8A and FIG. 8B. Details are not described herein again.

Step S1013: When it is determined that there is one high-speed cell in the combined cell, determine whether the target cell and the neighboring cell in the combined cell are co-site cells.

Step S1014: Synchronously send data to the UEs in the high-speed movement state by using the target cell and the neighboring cell if the two cells are co-site cells.

Step S1015: Obtain information about a transmission delay between the target cell and the neighboring cell if the two cells are not co-site cells.

Step S1016: Synchronously send data to the UEs in the high-speed movement state by using the target cell and the neighboring cell after a corresponding time is delayed in the target cell according to the information about the transmission delay.

Specifically, for step S1013 to step S1016, refer to step S807 to step S810 in the embodiment in FIG. 8A and FIG. 8B. Details are not described herein again.

Step S1017: Separate the target cell from the neighboring cell when the quantity of the UEs in the high-speed movement state in the target cell is less than or equal to the first preset quantity and the target cell and the neighboring cell are in a cell combined state.

Step S1018: When it is determined that there is a UE in the low-speed movement state on the first carrier frequency for the target cell, hand over at least one UE in the low-speed movement state to the second carrier frequency to perform data transmission and receiving.

Specifically, for step S1017 and step S1018, refer to step S911 and step S912 in the embodiment in FIG. 9A and FIG. 9B. Details are not described herein again.

Figure 11:
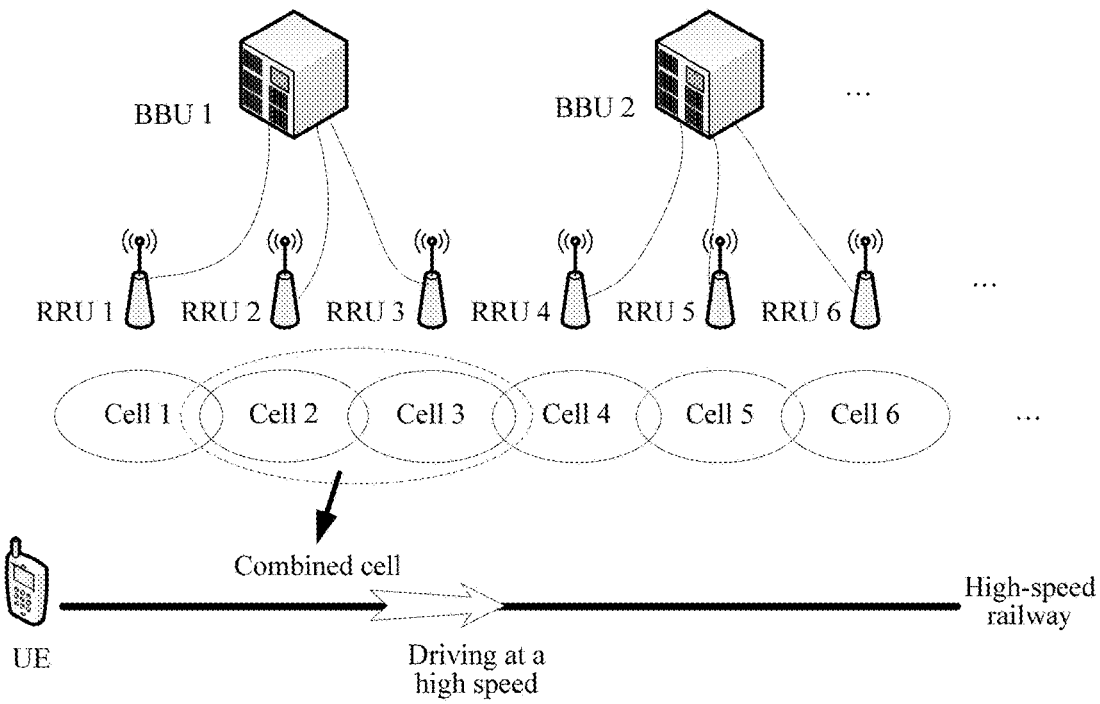
FIG. 11 and FIG. 12 are schematic diagrams of a specific application scenario for dynamically combining cells according to an embodiment of the present invention.
Figure 12:
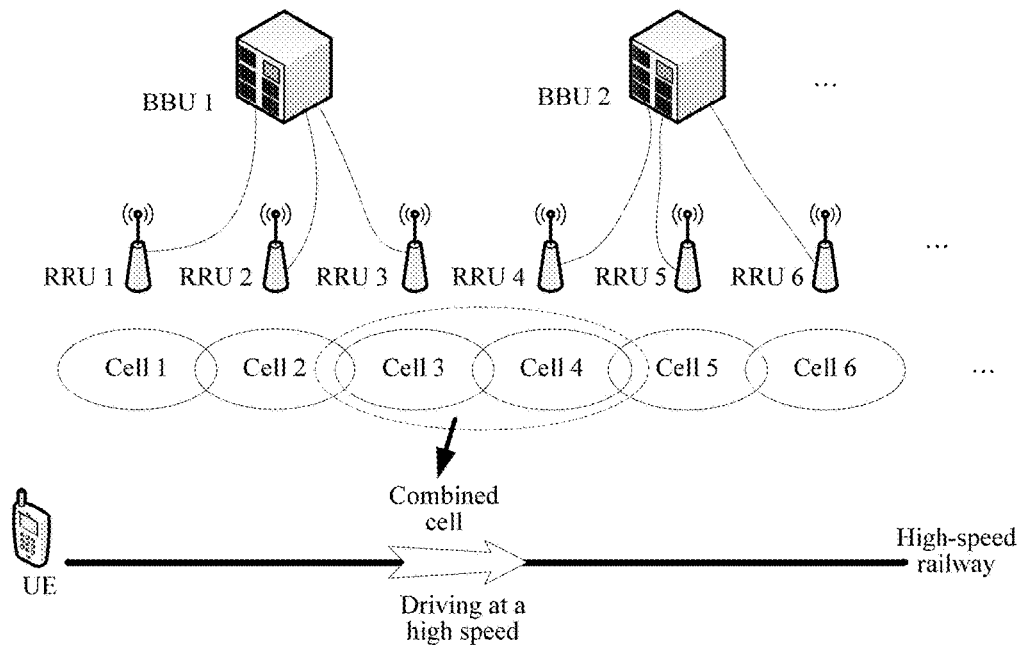

In a specific application scenario, as shown in FIG. 11 and FIG. 12, FIG. 11 and FIG. 12 are schematic diagrams of a specific application scenario of a method for dynamically combining cells according to an embodiment of the present invention. In FIG. 11, a target cell cell 2 includes more UEs in a high-speed movement state, and in this case, a driving direction of a train is from left to right in the figure. Therefore, cell 2 and cell 3 are combined. In FIG. 12, the train arrives at cell 3, and when detecting that a quantity of UEs in the high-speed movement state in cell 3 is greater than a particular quantity, a network device corresponding to the target cell cell 3 at this moment learns a direction of the train according to a cell handover record or cell combination record of the UEs in the high-speed movement state, and combines cell 3 and cell 4. For more specific implementation details, refer to the method embodiments in FIG. 2 to FIG. 10A and FIG. 10B. Details are not described herein again.

Figure 13:
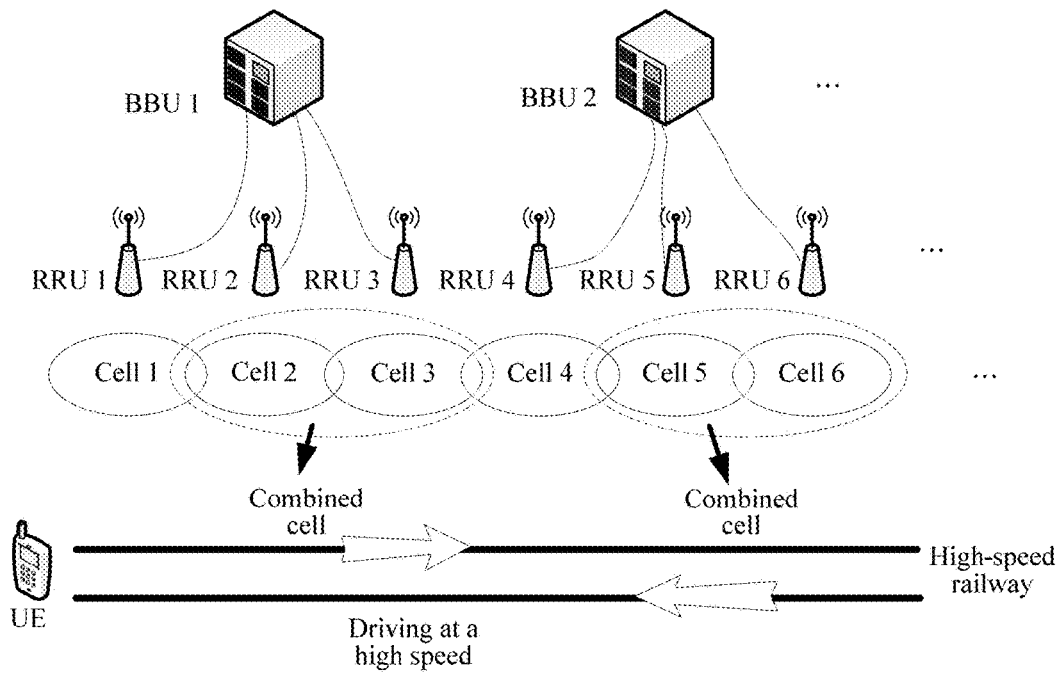
FIG. 13 and FIG. 14 are schematic diagrams of another specific application scenario for dynamically combining cells according to an embodiment of the present invention.
Figure 14:
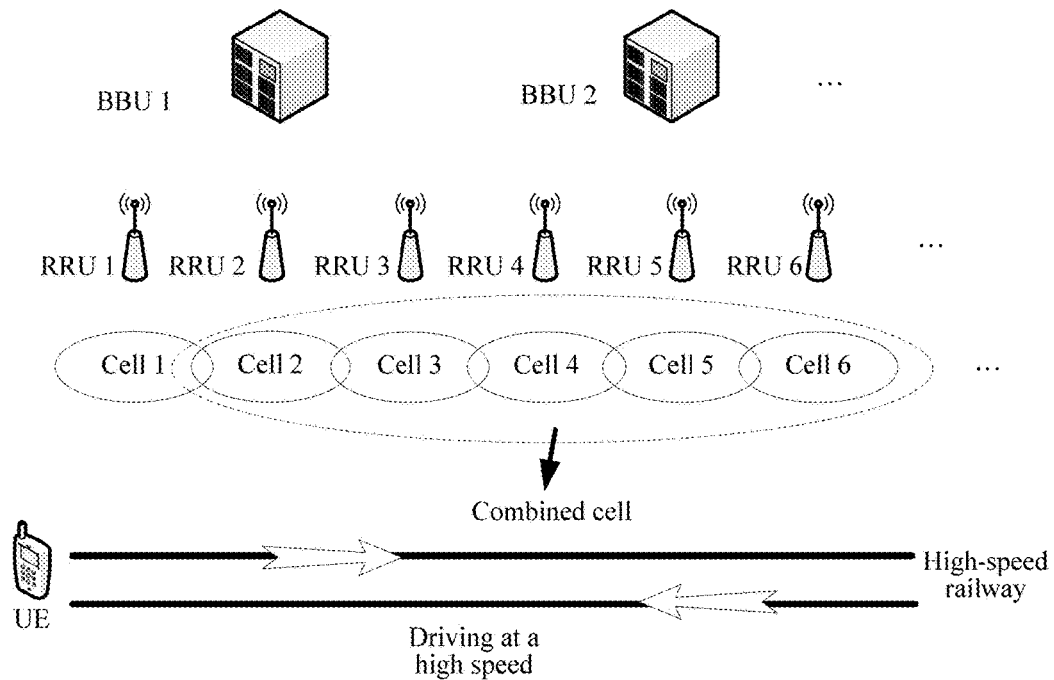

In a specific application scenario, as shown in FIG. 13 and FIG. 14, FIG. 13 and FIG. 14 are schematic diagrams of another specific application scenario of a method for dynamically combining cells according to an embodiment of the present invention. In FIG. 13, both a target cell cell 2 and a target cell cell 6 include more UEs in a high-speed movement state. That is, in this case, two trains drive from different directions. One train from left to right is in cell 2, and cell 2 and cell 3 are combined; the other train from right to left is in cell 6, and cell 5 and cell 6 are combined. It can be predicted that in a next time period, a scenario in FIG. 14 appears. That is, two cells obtained through combination get closer to the middle. In this case, cell 2, cell 3, cell 4, cell 5, and cell 6 are combined to form a combined cell. Multiple cells in the combined cell include a UE in the high-speed movement state, and there are cells of different sites. In this case, time domain resources need to be coordinately allocated, and delay information needs to be calculated for synchronous data sending. For more specific implementation details, refer to the method embodiments in FIG. 2 to FIG. 10A and FIG. 10B. Details are not described herein again.

In this embodiment of the present invention, a quantity of user equipments UEs in a high-speed movement state in a target cell is obtained; and the target cell is combined with a neighboring cell when it is determined that the quantity of the UEs in the high-speed movement state is greater than a first preset quantity, and data is sent to the UEs in the high-speed movement state by using a combined cell. That is, in this embodiment of the present invention, a busy/idle status of a cell is detected in real time, and cells are dynamically combined according to busy/idle statuses. In this way, the combined cell provides a no-handover service to the UEs in the high-speed movement state, and a cell that is not combined can still support a terrestrial user, that is, a UE in a low-speed movement state, resolving a problem in the prior art that a cell capacity is limited and a cell cannot support a terrestrial user because cells along a high-speed transportation line are used as one cell in the entire journey by means of a super cell, effectively increasing a capacity of the cells along the high-speed transportation line, and ensuring communication quality of the UEs in the high-speed movement state. In addition, in this embodiment of the present invention, the combined cell may be further dynamically separated, so as to release a resource when there are fewer UEs in the high-speed movement state, further increasing the capacity of the cells along the high-speed transportation line.

Figure 15:
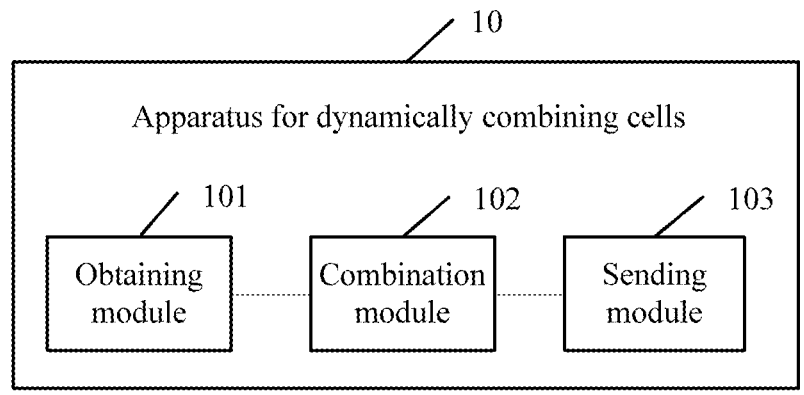
FIG. 15 is a schematic structural diagram of an embodiment of an apparatus for dynamically combining cells according to the present invention.

Referring to FIG. 15, a schematic structural diagram of an embodiment of an apparatus for dynamically combining cells according to an embodiment of the present invention is described in detail. The apparatus 10 may include an obtaining module 101, a combination module 102, and a sending module 103.

The obtaining module 101 is configured to obtain a quantity of user equipments UEs in a high-speed movement state in a target cell. The target cell is capable of being combined with a neighboring cell of the target cell, the target cell and the neighboring cell are cells distributed along a high-speed movement path, and the UEs in the high-speed movement state are UEs that are in a connected mode and whose movement speeds are greater than a preset threshold.

The combination module 102 is configured to combine the target cell with the neighboring cell when the quantity of the UEs in the high-speed movement state in the target cell is greater than a first preset quantity.

The sending module 103 is configured to send data to the UEs in the high-speed movement state by using a combined cell.

Figure 16:
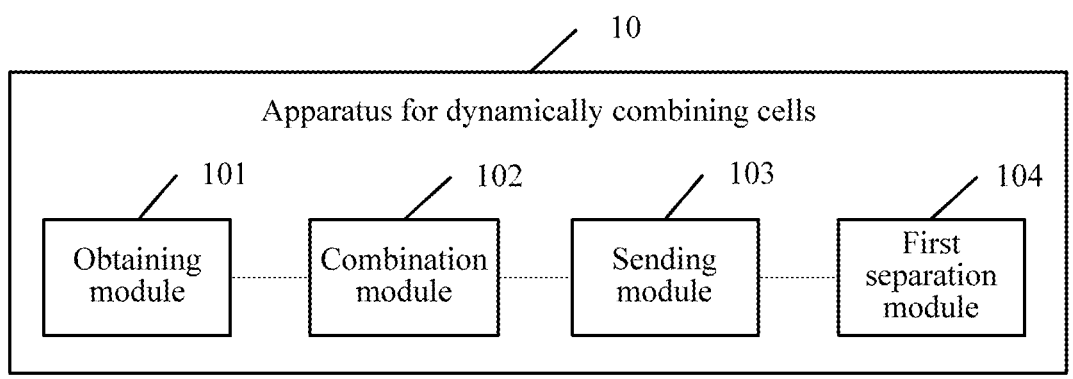
FIG. 16 is a schematic structural diagram of another embodiment of an apparatus for dynamically combining cells according to the present invention.

Specifically, FIG. 16 is a schematic structural diagram of another embodiment of an apparatus for dynamically combining cells according to the present invention. The apparatus for dynamically combining cells may further include a first separation module 104.

The first separation module 104 is configured to separate the target cell from the neighboring cell when the quantity of the UEs in the high-speed movement state in the target cell is less than or equal to the first preset quantity and the target cell and the neighboring cell are in a cell combined state.

Figure 17:
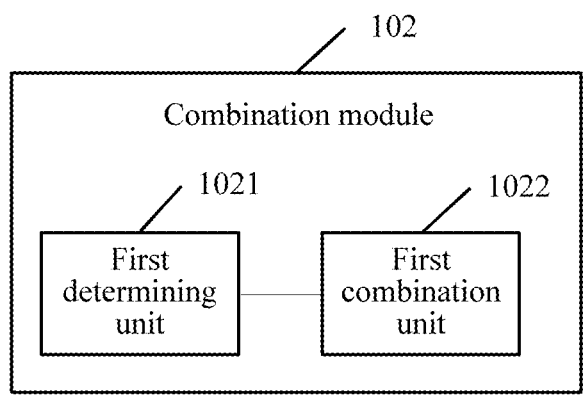
FIG. 17 is a schematic structural diagram of another embodiment of a combination module according to the present invention.

Further, FIG. 17 is a schematic structural diagram of another embodiment of a combination module according to the present invention. The combination module 102 may include a first determining unit 1021 and a first combination unit 1022.

The first determining unit 1021 is configured to determine a movement direction of the UEs in the high-speed movement state when the quantity of the UEs in the high-speed movement state in the target cell is greater than the first preset quantity.

The first combination unit 1022 is configured to combine, according to the movement direction, the target cell with a neighboring cell that the UEs in the high-speed movement state are about to enter.

Figure 18:
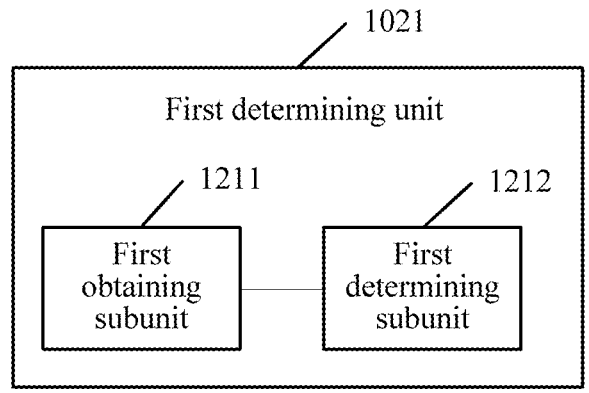
FIG. 18 is a schematic structural diagram of another embodiment of a first determining unit according to the present invention.

Further, FIG. 18 is a schematic structural diagram of another embodiment of a first determining unit according to the present invention. The first determining unit 1021 may include a first obtaining subunit 1211 and a first determining subunit 1212.

The first obtaining subunit 1211 is configured to obtain a cell handover history record of the UEs in the high-speed movement state.

The first determining subunit 1212 is configured to determine the movement direction of the UEs in the high-speed movement state according to the cell handover history record.

Figure 19:
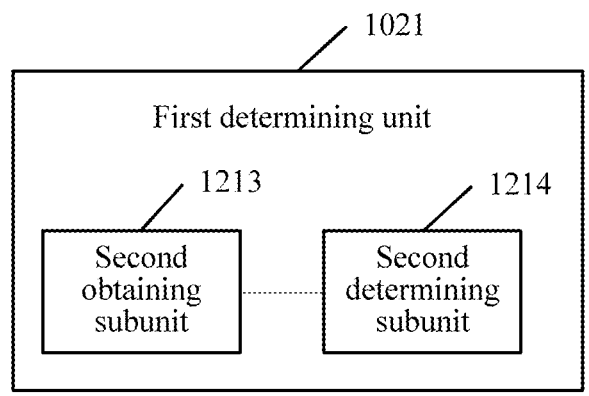
FIG. 19 is a schematic structural diagram of still another embodiment of a first determining unit according to the present invention.

Further, FIG. 19 is a schematic structural diagram of still another embodiment of a first determining unit according to the present invention. The first determining unit may include a second obtaining subunit 1213 and a second determining subunit 1214.

The second obtaining subunit 1213 is configured to obtain a unique identifier of a neighboring cell with which the target cell is combined last time. The unique identifier is a numeric identifier that sequentially marks the cell distributed along the high-speed movement path.

The second determining subunit 1214 is configured to determine and predict the movement direction of the UEs in the high-speed movement state according to a unique identifier of the target cell and the obtained unique identifier of the neighboring cell.

Figure 20:
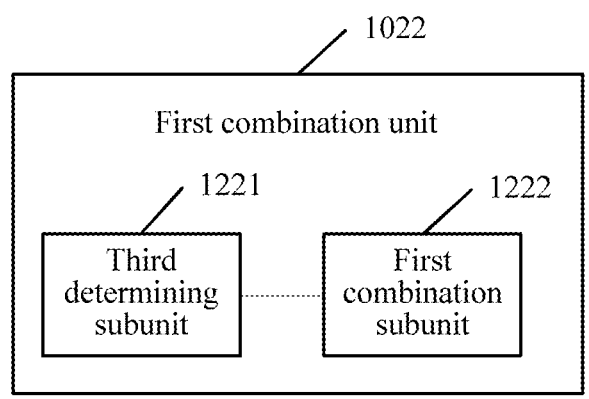
FIG. 20 is a schematic structural diagram of another embodiment of a first combination unit according to the present invention.

Further, FIG. 20 is a schematic structural diagram of another embodiment of a first combination unit according to the present invention. The obtaining module 101 is specifically configured to perform the step of obtaining a quantity of user equipments UEs in a high-speed movement state in a target cell according to a preset time interval.

The first combination unit 1022 may include a third determining subunit 1221 and a first combination subunit 1222.

The third determining subunit 1221 is configured to determine, according to the movement direction, whether the target cell has been combined with the neighboring cell that the UEs in the high-speed movement state are about to enter.

The first combination subunit 1222 is configured to combine the target cell with the neighboring cell that the UEs are about to enter if the two cells are not combined.

Figure 21:
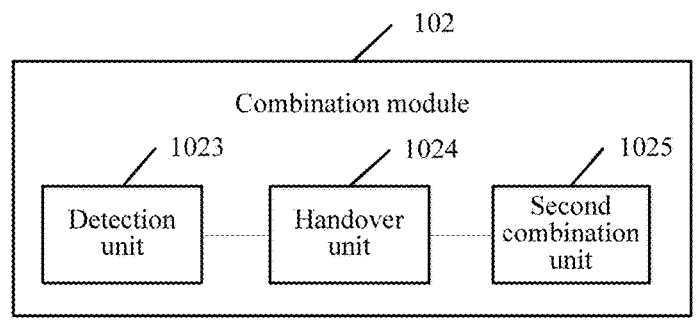
FIG. 21 is a schematic structural diagram of still another embodiment of a combination module according to the present invention.

Further, FIG. 21 is a schematic structural diagram of still another embodiment of a combination module according to the present invention. Both the target cell and the neighboring cell support a first carrier frequency and a second carrier frequency. The combination module 102 may include a detection unit 1023, a handover unit 1024, and a second combination unit 1025.

The detection unit 1023 is configured to detect whether the target cell includes a UE in a low-speed movement state when the quantity of the UEs in the high-speed movement state in the target cell is greater than the first preset quantity, where the UE in the low-speed movement state is a UE that is in a connected mode and whose movement speed is less than the preset threshold.

The handover unit 1024 is configured to: if a determining result is that the target cell includes the UE in the low-speed movement state, hand over the UE in the low-speed movement state to the first carrier frequency to perform data transmission and receiving, and hand over the UEs in the high-speed movement state to the second carrier frequency to perform data transmission and receiving.

The second combination unit 1025 is configured to combine the target cell with the neighboring cell.

Figure 22:
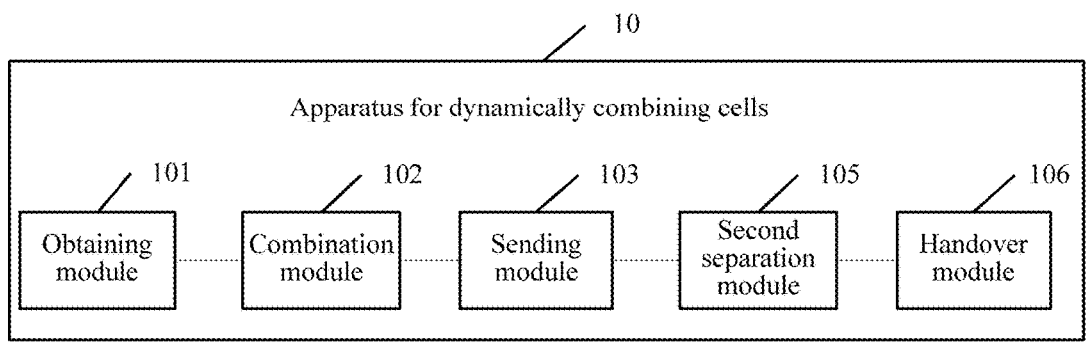
FIG. 22 is a schematic structural diagram of still another embodiment of an apparatus for dynamically combining cells according to the present invention.

Further, FIG. 22 is a schematic structural diagram of still another embodiment of an apparatus for dynamically combining cells according to the present invention. The apparatus 10 for dynamically combining cells may further include a second separation module 105 and a handover module 106.

The second separation module 105 is configured to separate the target cell from the neighboring cell when the quantity of the UEs in the high-speed movement state in the target cell is less than or equal to the first preset quantity and the target cell and the neighboring cell are in a cell combined state.

The handover module 106 is configured to: when it is determined that there is a UE in the low-speed movement state on the first carrier frequency for the target cell, hand over at least one UE in the low-speed movement state to the second carrier frequency to perform data transmission and receiving.

Figure 23:
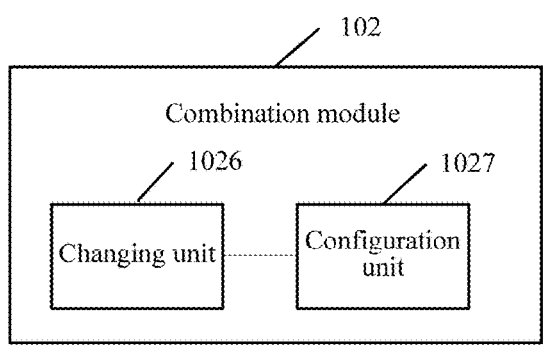
FIG. 23 is a schematic structural diagram of still another embodiment of a combination module according to the present invention.

Further, FIG. 23 is a schematic structural diagram of still another embodiment of a combination module according to the present invention. The combination module 102 may include a changing unit 1026 and a configuration unit 1027.

The changing unit 1026 is configured to change respective physical cell identifiers PCIs of the target cell and the neighboring cell into a preset PCI when the quantity of the UEs in the high-speed movement state in the target cell is greater than the first preset quantity.

The configuration unit 1027 is configured to configure a parameter for the target cell and the neighboring cell according to a preset cell combination rule.

Figure 24:
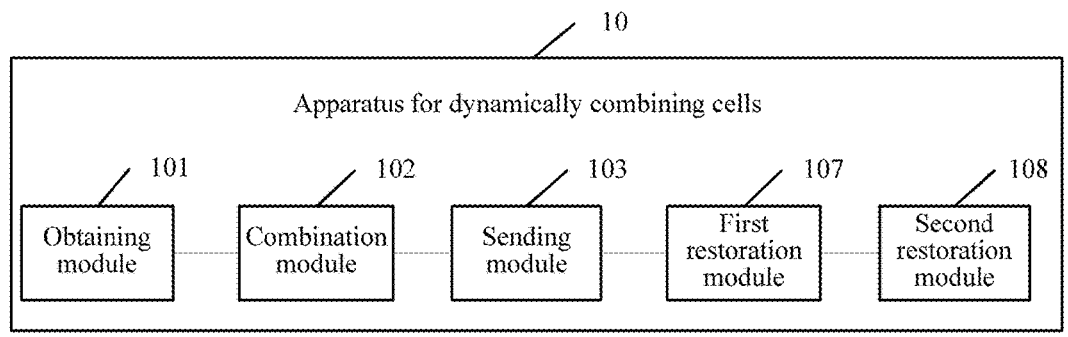
FIG. 24 is a schematic structural diagram of still another embodiment of an apparatus for dynamically combining cells according to the present invention.

Further, FIG. 24 is a schematic structural diagram of still another embodiment of an apparatus for dynamically combining cells according to the present invention. The apparatus 10 for dynamically combining cells may further include a first restoration module 107 and a second restoration module 108.

The first restoration module 107 is configured to: when the quantity of the UEs in the high-speed movement state in the target cell is less than or equal to the first preset quantity and the target cell and the neighboring cell are in the cell combined state, restore the preset PCI into which the PCI of the target cell is changed to a PCI that exists before the cell combination.

The second restoration module 108 is configured to restore the parameter configured for the target cell according to the preset cell combination rule to a parameter that exists before the cell combination.

Further, the sending module 103 is specifically configured to:

cooperatively send the data to the UEs in the high-speed movement state by using the target cell and the neighboring cell in the combined cell.

Figure 25:
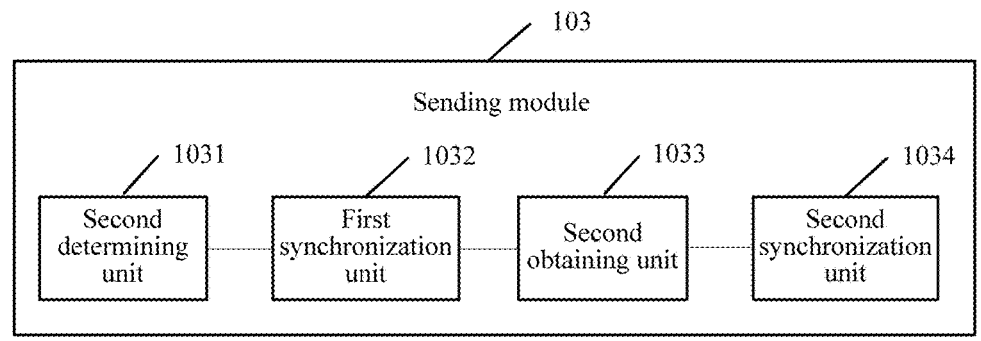
FIG. 25 is a schematic structural diagram of another embodiment of a sending module according to the present invention.

Further, FIG. 25 is a schematic structural diagram of another embodiment of a sending module according to the present invention. Cells along a high-speed transportation line use IP radio access network IPRAN networking. The sending module 103 may further include a second determining unit 1031, a first synchronization unit 1032, an obtaining unit 1033, and a second synchronization unit 1034.

The second determining unit 1031 is configured to determine whether the target cell and the neighboring cell in the combined cell are co-site cells.

The first synchronization unit 1032 is configured to synchronously send the data to the UEs in the high-speed movement state by using the target cell and the neighboring cell if a determining result is that the two cells are co-site cells.

The second obtaining unit 1033 is configured to obtain information about a transmission delay between the target cell and the neighboring cell if a determining result is that the two cells are not co-site cells.

The second synchronization unit 1034 is configured to synchronously send the data to the UEs in the high-speed movement state by using the target cell and the neighboring cell after a corresponding time is delayed in the target cell according to the information about the transmission delay.

Figure 26:
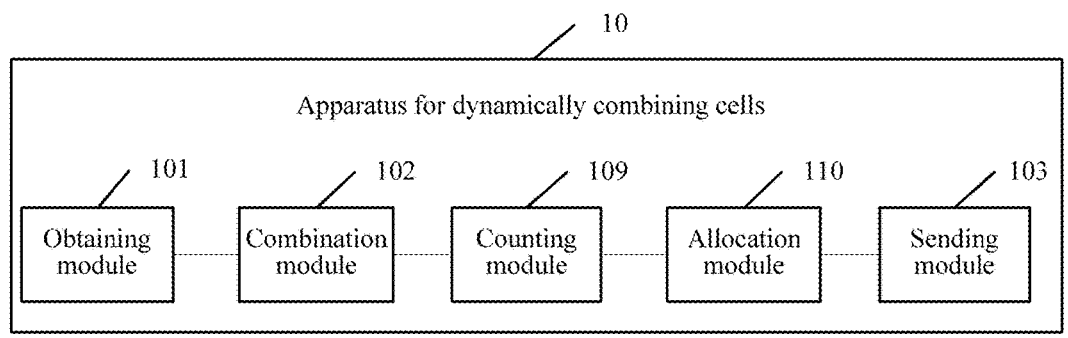
FIG. 26 is a schematic structural diagram of still another embodiment of an apparatus for dynamically combining cells according to the present invention.

Further, FIG. 26 is a schematic structural diagram of still another embodiment of an apparatus for dynamically combining cells according to the present invention. The apparatus may further include a counting module 109 and an allocation module no.

The counting module 109 is configured to: when it is determined that there is more than one high-speed cell in the combined cell, obtain a quantity of UEs in the high-speed movement state in each cell in the combined cell, and count a total quantity of UEs in the high-speed movement state, where the high-speed cell is a cell, in the combined cell, in which a quantity of UEs in the high-speed movement state is greater than a second preset quantity.

The allocation module no is configured to dynamically allocate time domain resources to the UEs in the high-speed movement state within a transmission time interval TTI of the combined cell according to the total quantity of the UEs in the high-speed movement state and a preset allocation rule, so as to perform, on the allocated time domain resources, the step of sending data to the UEs in the high-speed movement state by using a combined cell.

It can be understood that, for functions of the modules of the apparatus 10 for dynamically combining cells, correspondingly refer to the specific implementations in the method embodiments in FIG. 2 to FIG. 10A and FIG. 10B. Details are not described herein again.

For ease of better implementing the foregoing solutions of the embodiments of the present invention, the present invention further provides a related device configured to cooperatively implement the foregoing solutions. Detailed descriptions are provided below with reference to a schematic structural diagram of an embodiment of a network device according to the present invention shown in FIG. 27.

Figure 27:
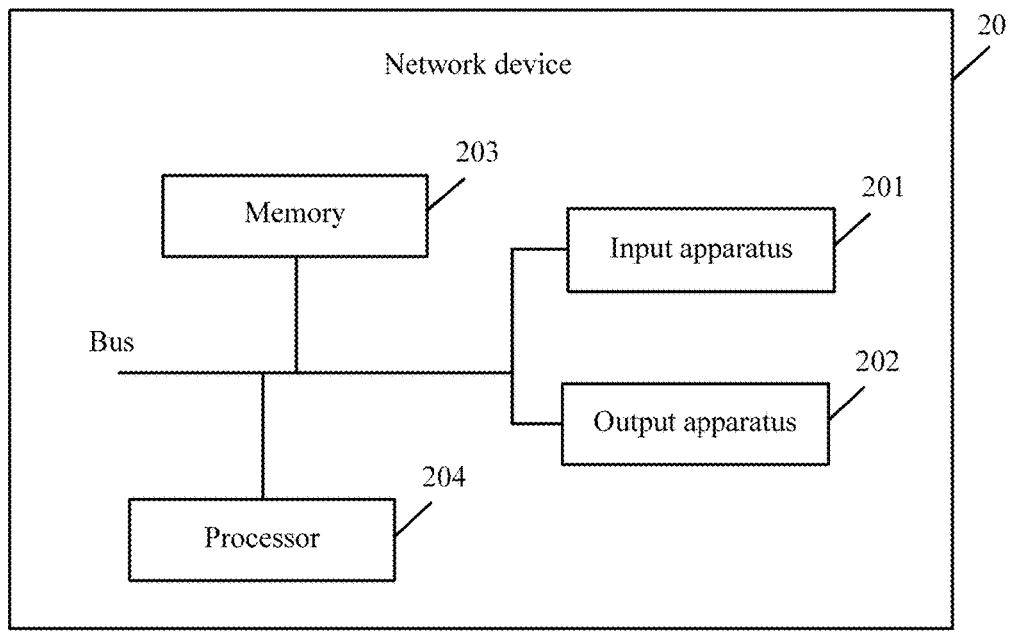
FIG. 27 is a schematic structural diagram of an embodiment of a network device according to the present invention.

The network device 20 includes an input apparatus 201, an output apparatus 202, a memory 203, and a processor 204 (the network device 20 may include one or more processors 204, and in FIG. 27, one processor is used as an example). In some embodiments of the present invention, the input apparatus 201, the output apparatus 202, the memory 203, and the processor 204 may be connected by using a bus or in another manner. In FIG. 27, an example in which connection is implemented by using a bus is used.

The memory 203 is configured to store program code. The processor 204 is configured to invoke the program code stored in the memory 203 to perform the following steps: obtaining, by using the input apparatus 201, a quantity of user equipments UEs in a high-speed movement state in a target cell, where the target cell is capable of being combined with a neighboring cell of the target cell, the target cell and the neighboring cell are cells distributed along a high-speed movement path, and the UEs in the high-speed movement state are UEs that are in a connected mode and whose movement speeds are greater than a preset threshold; and combining the target cell with the neighboring cell when the quantity of the UEs in the high-speed movement state in the target cell is greater than a first preset quantity, and sending, by using the output apparatus 202, data to the UEs in the high-speed movement state by using a combined cell.

Specifically, the processor 204 is further configured to invoke the program code stored in the memory 203 to perform the following step: separating the target cell from the neighboring cell when the quantity of the UEs in the high-speed movement state in the target cell is less than or equal to the first preset quantity and the target cell and the neighboring cell are in a cell combined state.

Further, when the quantity of the UEs in the high-speed movement state in the target cell is greater than the first preset quantity, that the processor 204 combines the target cell with the neighboring cell includes: determining a movement direction of the UEs in the high-speed movement state when the quantity of the UEs in the high-speed movement state in the target cell is greater than the first preset quantity; and combining, according to the movement direction, the target cell with a neighboring cell that the UEs in the high-speed movement state are about to enter.

Further, that the processor 204 determines a movement direction of the UEs in the high-speed movement state includes: obtaining, by using the input apparatus 201, a cell handover history record of the UEs in the high-speed movement state; and determining the movement direction of the UEs in the high-speed movement state according to the cell handover history record.

Further, that the processor 204 determines a movement direction of the UEs in the high-speed movement state includes: obtaining, by using the input apparatus 201, a unique identifier of a neighboring cell with which the target cell is combined last time, where the unique identifier is a numeric identifier that sequentially marks the cell distributed along the high-speed movement path; and determining and predicting the movement direction of the UEs in the high-speed movement state according to a unique identifier of the target cell and the obtained unique identifier of the neighboring cell.

Further, the step of obtaining a quantity of user equipments UEs in a high-speed movement state in a target cell is performed according to a preset time interval.

That the processor 204 combines, according to the movement direction, the target cell with a neighboring cell that the UEs in the high-speed movement state are about to enter includes: determining, according to the movement direction, whether the target cell has been combined with the neighboring cell that the UEs in the high-speed movement state are about to enter; and combining the target cell with the neighboring cell that the UEs are about to enter if the two cells are not combined.

Further, the target cell and the neighboring cell support a first carrier frequency and a second carrier frequency.

Before the processor 204 combines the target cell with the neighboring cell, the following steps are further included: detecting whether the target cell includes a UE in a low-speed movement state, where the UE in the low-speed movement state is a UE that is in a connected mode and whose movement speed is less than the preset threshold; and if the target cell includes the UE in the low-speed movement state, handing over the UE in the low-speed movement state to the first carrier frequency to perform data transmission and receiving, and handing over the UEs in the high-speed movement state to the second carrier frequency to perform data transmission and receiving.

Further, after the processor 204 obtains, by using the input apparatus, a quantity of user equipments UEs in a high-speed movement state in a target cell, the following steps are further included: separating the target cell from the neighboring cell when the quantity of the UEs in the high-speed movement state in the target cell is less than or equal to the first preset quantity and the target cell and the neighboring cell are in the cell combined state; and when it is determined that there is a UE in the low-speed movement state on the first carrier frequency for the target cell, handing over at least one UE in the low-speed movement state to the second carrier frequency to perform data transmission and receiving.

Further, that the processor 204 combines the target cell with the neighboring cell includes: changing respective physical cell identifiers PCIs of the target cell and the neighboring cell into a preset PCI; and configuring a parameter for the target cell and the neighboring cell according to a preset cell combination rule.

Further, after the processor 204 obtains, by using the input apparatus 201, a quantity of user equipments UEs in a high-speed movement state in a target cell, the following steps are further included: when the quantity of the UEs in the high-speed movement state in the target cell is less than or equal to the first preset quantity and the target cell and the neighboring cell are in the cell combined state, restoring the preset PCI into which the PCI of the target cell is changed to a PCI that exists before the cell combination; and restoring the parameter configured for the target cell according to the preset cell combination rule to a parameter that exists before the cell combination.

Further, that the processor 204 sends, by using the output apparatus 202, data to the UEs in the high-speed movement state by using a combined cell includes: cooperatively sending, by using the output apparatus 202, the data to the UEs in the high-speed movement state by using the target cell and the neighboring cell in the combined cell.

Further, the cells distributed along the high-speed movement path use IP radio access network IPRAN networking.

That the processor 204 sends, by using the output apparatus 202, data to the UEs in the high-speed movement state by using a combined cell includes: determining whether the target cell and the neighboring cell in the combined cell are co-site cells; and synchronously sending, by using the output apparatus 202, the data to the UEs in the high-speed movement state by using the target cell and the neighboring cell if the two cells are co-site cells; or obtaining, by using the input apparatus 201, information about a transmission delay between the target cell and the neighboring cell if the two cells are not co-site cells; and synchronously sending, by using the output apparatus 202, the data to the UEs in the high-speed movement state by using the target cell and the neighboring cell after a corresponding time is delayed in the target cell according to the information about the transmission delay.

Further, before the processor 204 sends, by using the output apparatus 202, the data to the UEs in the high-speed movement state by using the combined cell, the following steps are further included: when it is determined that there is more than one high-speed cell in the combined cell, obtaining, by using the input apparatus 201, a quantity of UEs in the high-speed movement state in each cell in the combined cell, and counting a total quantity of UEs in the high-speed movement state, where the high-speed cell is a cell, in the combined cell, in which a quantity of UEs in the high-speed movement state is greater than a second preset quantity; and dynamically allocating time domain resources to the UEs in the high-speed movement state within a transmission time interval TTI of the combined cell according to the total quantity of the UEs in the high-speed movement state and a preset allocation rule, so as to send, by using the output apparatus 202 on the allocated time domain resources, the data to the UEs in the high-speed movement state by using the combined cell.

It can be understood that, for functions of the functional modules of the network device 20, correspondingly refer to the specific implementations in the method embodiments in FIG. 2 to FIG. 10A and FIG. 10B. Details are not described herein again.

Figure 28:
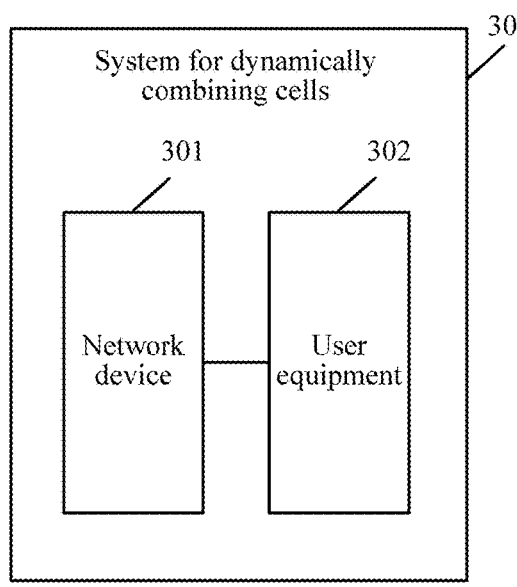
FIG. 28 is a schematic structural diagram of a system for dynamically combining cells according to the present invention.

FIG. 28 is a schematic structural diagram of a system for dynamically combining cells according to the present invention. The system 30 includes a network device 301 and user equipment 302.

The network device 301 may be the network device 20 in the embodiment in FIG. 27. It can be understood that the system 30 in this embodiment of the present invention may further include devices such as a server and a service center.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What are disclosed above are merely examples of embodiments of the present invention, and certainly are not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method, comprising:
 determining that a quantity of user equipments (UEs) in a target cell are in a high-speed movement state, wherein the target cell and a first neighboring cell of the target cell are cells distributed along a high-speed movement path, and the high-speed movement state includes that each UE of the quantity of UEs is in a connected mode and has a movement speed greater than a preset threshold;
 determining that the quantity of UEs in the high-speed movement state in the target cell is greater than a first preset quantity;
 combining the target cell with the first neighboring cell to form a combined cell; and
 sending data to one or more UEs of the quantity of UEs in the high-speed movement state by using the combined cell.

2. The method according to claim 1, further comprising:
 after combining the target cell with the first neighboring cell, determining that the quantity of UEs in the high-speed movement state in the target cell is less than or equal to the first preset quantity; and
 separating the target cell from the first neighboring cell.

3. The method according to claim 1, wherein combining the target cell with the first neighboring cell further comprises:
 determining a movement direction of the quantity of UEs in the high-speed movement state; and
 determining the first neighboring cell to be a neighboring cell that the quantity of UEs will enter according to the movement direction.

4. The method according to claim 3, wherein determining the movement direction comprises:
 obtaining a cell handover history record of the quantity of UEs in the high-speed movement state; and
 determining the movement direction of the quantity of UEs in the high-speed movement state according to the cell handover history record.

5. The method according to claim 3, wherein determining a movement direction comprises:
 obtaining a unique identifier of a neighboring cell with which the target cell has been previously combined, wherein the unique identifier is a numeric identifier that sequentially marks the cell distributed along the high-speed movement path; and
 determining the movement direction of the quantity of UEs in the high-speed movement state according to a unique identifier of the target cell and the obtained unique identifier of the neighboring cell.

6. The method according to claim 3, wherein determining that the quantity of UEs is in the high-speed movement state in the target cell is performed according to a preset time interval; and the method further comprises:
 combining the target cell with the first neighboring cell comprises:
 determining, according to the movement direction, whether the target cell has been combined with the first neighboring cell; and
 combining the target cell with the first neighboring cell when the target cell and first neighboring cell are not combined.

7. The method according to claim 1, wherein both the target cell and the first neighboring cell support a first carrier frequency and a second carrier frequency; and the method further comprises:
 before the combining the target cell with the first neighboring cell, detecting that the target cell comprises a UE in a low-speed movement state, wherein the low-speed movement state includes that the UE is in a connected mode and has a movement speed less than the preset threshold; and
 handing over the UE in the low-speed movement state to the first carrier frequency, and handing over the quantity of UEs in the high-speed movement state to the second carrier frequency.

8. The method according to claim 7, further comprising:
 after combining the target cell with the first neighboring cell, determining that the quantity of the UEs in the high-speed movement state in the target cell is less than or equal to the first preset quantity;
 separating the target cell from the first neighboring cell;

determining a second UE in the low-speed movement state is on the first carrier frequency for the target cell; and handing over the second UE in the low-speed movement state to the second carrier frequency.

9. The method according to claim 1, wherein combining the target cell with the first neighboring cell comprises:
changing respective physical cell identifiers (PCIs) of the target cell and the neighboring cell into a preset PCI; and
configuring a parameter for the target cell and the first neighboring cell according to a preset cell combination rule.

10. An apparatus, comprising:
a processor; and
a computer-readable storage medium storing a program to be executed by the processor, the program including instructions for:
determining that a quantity of user equipments UEs in a target cell are in a high-speed movement state, wherein the target cell and a first neighboring cell of the target cell are cells distributed along a high-speed movement path, and the high-speed movement state includes that each UE of the quantity of UEs is in a connected mode and has a movement speed greater than a preset threshold;
determining that the quantity of UEs in the high-speed movement state in the target cell is greater than a first preset quantity;
combining the target cell with the first neighboring cell to form a combined cell; and
sending data to one or more UEs of the quantity of UEs in the high-speed movement state by using the combined cell.

11. The apparatus according to claim 10, wherein the wherein the program further includes instructions for:
determining that the quantity of the UEs in the high-speed movement state in the target cell is less than or equal to the first preset quantity; and
separating the combined cell by separating the target cell from the first neighboring cell.

12. The apparatus according to claim 10, wherein combining the target cell with the first neighboring cell further comprises:
determining a movement direction of the quantity of UEs in the high-speed movement state; and
determining the first neighboring cell to be a neighboring cell that the quantity of UEs will enter according to the movement direction.

13. The apparatus according to claim 12, wherein determining the movement direction comprises:
obtaining a cell handover history record of the quantity of UEs in the high-speed movement state; and
determining the movement direction of the quantity of UEs in the high-speed movement state according to the cell handover history record.

14. The apparatus according to claim 12, wherein determining the movement direction comprises:
obtaining a unique identifier of a neighboring cell with which the target cell has been previously combined, wherein the unique identifier is a numeric identifier that sequentially marks the cell distributed along the high-speed movement path; and
determining the movement direction of the quantity of UEs in the high-speed movement state according to a unique identifier of the target cell and the obtained unique identifier of the neighboring cell.

15. The apparatus according to claim 12, wherein determining that the quantity of UEs is in the high-speed movement state in the target cell is performed according to a preset time interval; and wherein the program further includes instructions for:
determining, according to the movement direction, whether the target cell has been combined with the first neighboring cell; and
combining the target cell with the first neighboring cell when the target cell and the first neighboring cells are not combined.

16. The apparatus according to claim 10, wherein both the target cell and the first neighboring cell support a first carrier frequency and a second carrier frequency; and wherein the program further includes instructions for:
detecting that the target cell comprises a UE in a low-speed movement state, wherein the low-speed movement state includes that the UE is in a connected mode and has a movement speed less than the preset threshold;
handing over the UE in the low-speed movement state to the first carrier frequency, and handing over the quantity of UEs in the high-speed movement state to the second carrier frequency.

17. The apparatus according to claim 16, wherein the program further includes instructions for:
determining that the quantity of UEs in the high-speed movement state in the target cell of the combined cell is less than or equal to the first preset quantity;
separating the target cell from the first neighboring cell;
determining a second UE in the low-speed movement state is on the first carrier frequency for the target cell; and
handing over the second UE in the low-speed movement state to the second carrier frequency.

18. The apparatus according to claim 16, wherein combining the target cell and the first neighboring cell comprises:
changing respective physical cell identifiers PCIs of the target cell and the first neighboring cell into a preset PCI; and
configuring a parameter for the target cell and the first neighboring cell according to a preset cell combination rule.

19. The apparatus according to claim 18, wherein the program further includes instructions for:
determining that the quantity of UEs in the high-speed movement state in the target cell of the combined cell is less than or equal to the first preset quantity;
restoring the preset PCI into which the PCI of the target cell is changed to a PCI that exists before the cell combination; and
restoring the parameter configured for the target cell according to the preset cell combination rule to a parameter that exists before the cell combination.

20. The apparatus according to claim 10, wherein sending the data comprises:
cooperatively send the data to the one or more UEs by using the target cell and the first neighboring cell in the combined cell.

* * * * *